US012630914B2

(12) United States Patent
Hiraoka

(10) Patent No.: US 12,630,914 B2
(45) Date of Patent: May 19, 2026

(54) PROCESSING METHOD AND PROCESSING APPARATUS FOR METAL COMPONENT

(71) Applicant: PARKER NETSUSHORI KOGYO CO., LTD., Tokyo (JP)

(72) Inventor: Yasushi Hiraoka, Tokyo (JP)

(73) Assignee: Parker Netsushori Kogyo Co., Ltd., Tokyo (JP)

( * ) Notice: Subject to any disclaimer, the term of this patent is extended or adjusted under 35 U.S.C. 154(b) by 442 days.

(21) Appl. No.: 18/253,499

(22) PCT Filed: Nov. 16, 2021

(86) PCT No.: PCT/JP2021/042043
§ 371 (c)(1),
(2) Date: May 18, 2023

(87) PCT Pub. No.: WO2022/107753
PCT Pub. Date: May 27, 2022

(65) Prior Publication Data

US 2024/0011142 A1 Jan. 11, 2024

(30) Foreign Application Priority Data

Nov. 18, 2020 (JP) ................................ 2020-191410

(51) Int. Cl.
*C23C 8/56* (2006.01)
*C21D 1/06* (2006.01)
(Continued)

(52) U.S. Cl.
CPC .................. *C23C 8/56* (2013.01); *C21D 1/06* (2013.01); *C21D 1/76* (2013.01); *C21D 1/767* (2013.01);
(Continued)

(58) Field of Classification Search
CPC .... C21D 1/76; C23C 8/56; C23C 8/54; C23C 8/48; C23C 8/30; C23C 8/32; C23C 8/24; F27D 7/02
See application file for complete search history.

(56) References Cited

U.S. PATENT DOCUMENTS 4,975,147 A 12/1990 Tahara et al.
5,013,371 A 5/1991 Tahara et al.
(Continued)

FOREIGN PATENT DOCUMENTS

CN 102471864 A 5/2012
CN 102844459 A 12/2012
(Continued)

OTHER PUBLICATIONS

"Heat Treatment", vol. 18, No. 5, pp. 255-262 (Kiyomitsu Otomo).
(Continued)

*Primary Examiner* — Jessee R Roe
(74) *Attorney, Agent, or Firm* — Renner, Kenner; Arthur M. Reginelli

(57) ABSTRACT

The present invention is a processing method for a metal component by using a processing furnace. The method includes the steps of: introducing an activation atmospheric gas into the processing furnace; heating the activation atmospheric gas in the processing furnace to a first temperature; introducing a nitriding atmospheric gas or a nitrocarburizing atmospheric gas into the processing furnace; and heating the nitriding atmospheric gas or the nitrocarburizing atmospheric gas in the processing furnace to a second temperature. The activation atmospheric gas is introduced into the processing furnace through a pipe for introducing the activation atmospheric gas. A liquid organic solvent is introduced intermittently a plurality of times into the pipe for introducing the activation atmospheric gas which is under a
(Continued)

state wherein the activation atmosphere gas continues to be introduced.

22 Claims, 7 Drawing Sheets

(51) Int. Cl.

| | |
|---|---|
| ***C21D 1/76*** | (2006.01) |
| ***C21D 1/767*** | (2006.01) |
| ***C21D 9/00*** | (2006.01) |
| ***C23C 8/32*** | (2006.01) |
| ***F27D 7/02*** | (2006.01) |

(52) U.S. Cl.

CPC .............. *C21D 9/0006* (2013.01); *C23C 8/32* (2013.01); *F27D 7/02* (2013.01); *F27D 2007/023* (2013.01)

(56) References Cited

U.S. PATENT DOCUMENTS

| | | | |
|---|---|---|---|
| 5,141,567 | A | 8/1992 | Tahara et al. |
| 5,252,145 | A | 10/1993 | Tahara et al. |
| 5,254,181 | A | 10/1993 | Yoshino et al. |
| 5,340,412 | A | 8/1994 | Yoshino et al. |
| 5,382,318 | A | 1/1995 | Tahara et al. |
| 5,419,948 | A | 5/1995 | Yoshino et al. |
| 5,460,875 | A | 10/1995 | Yoshino et al. |
| 2007/0204934 | A1 | 9/2007 | Hoshino et al. |
| 2012/0111456 | A1 | 5/2012 | Christiansen et al. |

FOREIGN PATENT DOCUMENTS

| | | | |
|---|---|---|---|
| JP | S55119119 | A | 9/1980 |
| JP | S5729574 | A | 2/1982 |
| JP | H03-044457 | A | 2/1991 |
| JP | H06-299317 | A | 10/1994 |
| JP | H08296028 | A | 11/1996 |
| JP | H09-038341 | A | 2/1997 |
| JP | H10-219418 | A | 8/1998 |
| JP | 2004-307971 | A | 11/2004 |
| JP | 2005532471 | A | 10/2005 |
| JP | 4861703 | B2 | 1/2012 |
| JP | 2012-533687 | A | 12/2012 |
| JP | 5826748 | B2 | 12/2015 |
| WO | 2019131602 | A1 | 7/2019 |

OTHER PUBLICATIONS

English Translation of International Search Report and Written Opinion for corresponding PCT/JP2021/042043 dated Dec. 14, 2021 (7 pp).

The second Chinese Office Action dated Nov. 13, 2025 for counterpart Chinese Application No. 202180077040.4 (31 pages).

Japanese Office Action dated Dec. 8, 2025 for counterpart Japanese Application No. 2022-563760 (10 pages).

PROCESSING METHOD AND PROCESSING APPARATUS FOR METAL COMPONENT

TECHNICAL FIELD

The present invention relates to a processing method and a processing apparatus for a metal component, which activates a surface of the metal component before conducting a gas nitriding treatment or a gas nitrocarburizing treatment.

BACKGROUND ART

Among various surface hardening treatments for a steel, there is a strong need for a nitriding treatment because it is a low distortion treatment. In particular, recently, interest in a gas nitriding treatment or a gas nitrocarburizing treatment has been increased. Such a gas nitriding treatment or a gas nitrocarburizing treatment has been widely applied to an automobile component (part), a metallic mold (die), or any other stainless steel component (part), in order to improve fatigue resistance thereof, wear resistance thereof and corrosion resistance thereof.

When applying such a treatment to a surface of a component made of an alloy steel, especially a high-alloy steel such as stainless steel, penetration and diffusion of nitrogen and/or carbon into the surface of the component may be prevented because of passivation film (an oxide, etc.) that may be present on the surface of the component. This may result in a poor and/or uneven treatment for the component, which is a problem. Therefore, prior to these diffusion-penetration treatments, the surface of the metal component is activated.

As a surface activation process, a method of using a chloride compound is known, whose representative example is a marcomizing process. As a chloride compound, a vinyl chloride resin, ammonium chloride, or methylene chloride, etc. may be used.

The chloride compound is introduced into a processing furnace together with a metal component to be heated. When heated, the chloride compound is decomposed to produce HCl. The produced HCl destroys (denatures) the passivation film on the surface of the metal component, and thus activates the surface. This ensures that the following diffusion-penetration treatment such as a nitriding treatment or a carburizing treatment in the next step is more reliable.

However, the surface activation of the surface of the metal component by means of the chloride compound as described above requires the chloride compound to be pre-installed in the vicinity of the metal component in the processing furnace in advance. This step is difficult to automate, and requires a manual operation of an operator. In addition, it is difficult to control the amount of the produced HCl, which may result in that the effects are not always optimal.

Furthermore, the produced HCl reacts with ammonium contained in an atmospheric gas during a gas nitriding treatment or a gas nitrocarburizing treatment, and produces ammonium chloride. The ammonium chloride not only can accumulate in the processing furnace and in an exhaust system therefrom, which may cause troubles, but it can also remain on the surface of the metal component (work), which may resulting in reduced corrosion resistance and reduced fatigue strength.

Instead of such a chloride compound, a method of using a fluorine compound ($NF_3$), which belongs to the same halogen group, is also in practical use for activating the surface of the metal component (for example, see JP-A-H03 (1991)-44457 (Patent Document 1)). The fluorine compound ($NF_3$) is decomposed during a heat treatment, and produces fluorine. The produced fluorine changes the passivation film on the surface of the metal component into a fluoride film, and thus activates the surface.

However, the surface activation of the metal component by means of the fluorine compound ($NF_3$) as described above requires a highly-advanced treatment to detoxify $NF_3$ and HF that may be contained in the exhaust gas. This inhibits a widespread use of the method.

As a pretreatment method that does not use a chloride compound nor a fluorine compound, a method of using a carbon compound is also in practical use (for example, see JP-B-4861703 (Patent Document 2), JP-A-H09(1997)-38341 (Patent Document 3) and JP-A-H10(1998)-219418 (Patent Document 4)). Specifically, acetylene is introduced into the furnace, HCN is produced during a reaction process starting with a thermal decomposition of acetylene, and the produced HCN reduces the passivation film on the surface of the metal component and activates the surface (JP-B-4861703 (Patent Document 2)). Alternatively, acetone vapor is introduced into the furnace, HCN is produced during a reaction process starting with a thermal decomposition of acetone vapor, and the produced HCN reduces the passivation film on the surface of the metal component and activates the surface (JP-A-H09(1997)-38341 (Patent Document 3) and JP-A-H10(1998)-219418 (Patent Document 4)).

Furthermore, a method of activating a metallic surface by means of a carbon nitrogen compound is described in JP-B-5826748 (Patent Document 5). JP-B-5826748 (Patent Document 5) refers to a method of using formamide, which is liquid at room temperature, in addition to a method of using urea and acetamide, which are solid at room temperature.

It has been known since the 1970s that a CO gas produces HCN in a furnace ("Heat Treatment", Volume 18, No. 5, pages 255-262 (Kiyomitsu Otomo): Non-Patent Document 1). It seems that, based on this knowledge, a carbon compound and/or a carbon nitrogen compound have been selected and studied as those that generate a CO gas in a furnace during a reaction process.

Herein, it is known that, for a SUS-based material whose passivation film is stronger (which has more Cr and Ni, such as SUS310S), the method of using HCN (a carbon compound and/or a carbon nitrogen compound) is less effective for activation than the method of using HCl (a chloride compound). Therefore, it is necessary to use (distinguish between) the method of using HCN (a carbon compound and/or a carbon nitrogen compound) and the method of using HCl (a chloride component), depending on the grade of steel.

DOCUMENT

The Patent Document 1 cited in the present specification is JP-A-H03(1991)-44457.

The Patent Document 2 cited in the present specification is JP-B-4861703.

The Patent Document 3 cited in the present specification is JP-A-H09(1997)-38341.

The Patent Document 4 cited in the present specification is JP-A-H10(1998)-219418.

The Patent Document 5 cited in the present specification is JP-B-5826748.

The Non-patent Document 1 cited in the present specification is "Heat Treatment", Volume 18, No. 5, pages 255-262 (Kiyomitsu Otomo).

SUMMARY OF INVENTION

Technical Problem

Regarding a carbon compound and/or a carbon nitrogen compound as well, if it is solid at room temperature, it has to be pre-installed in the vicinity of the metal component in the processing furnace in advance. This step is difficult to automate, and requires a manual operation of an operator. In addition, it is difficult to control the amount of the produced HCl, which may result in that the effects are not always optimal.

Regarding a carbon compound and/or a carbon nitrogen compound that is gaseous at room temperature, it may be introduced into a furnace while its introduction amount is suitably controlled by a mass flow controller, which is advantageous. However, it is not easy to handle a gas cylinder. A gas cylinder takes up a large space, which is also a problem. It is also necessary to take measures against a risk of gas leakage from a pipe. Furthermore, depending on a type of a carbon compound and/or a carbon nitrogen compound (especially, active species), they may be incompatible with a mass flow controller (a control of its introduction mount cannot be suitably conducted).

Regarding a carbon compound and/or a carbon nitrogen compound that is liquid at room temperature, it is generally gasified prior to being introduced into a furnace, in order to be introduced into the furnace while its introduction amount is suitably controlled (see paragraph 0010 of JP-B-4861703 (Patent Document 2), "Since acetone is liquid at room temperature, an equipment for introducing acetone vapor is required").

JP-B-5826748 (Patent Document 5) discloses that liquid formamide is directly introduced to a hot zone in a tubular furnace (small experimental furnace) through a probe (see paragraph 0081 of JP-B-5826748 (Patent Document 5)). However, this method is difficult to apply to a general production furnace. This is because, in a configuration where the probe is directly connected to a general production furnace, the high degree of heat radiation of the production furnace causes formamide in the probe to vaporize and flow backward, making it impossible to introduce a desired amount thereof into the furnace. Furthermore, there is another concern that the backward-flowing formamide may precipitate in a undesired piping, which may result in clogging of the piping.

The present inventor has found that, by introducing an organic solvent (which can be a chloride compound in addition to a carbon compound and/or a carbon nitrogen compound) that is liquid at room temperature into a pipe for introducing an activation atmosphere gas while the activation atmosphere gas continues to be introduced into a processing furnace, the occurrence of a situation in which the organic solvent vaporizes and flows back can be effectively inhibited even when the processing furnace is hot.

In addition, the present inventor has found that, by introducing an organic solvent that is liquid at room temperature intermittently a plurality of times, it is possible to achieve introduction of an appropriate amount thereof at timings suitable for a status in a processing furnace.

The present invention has been made based on the above findings. It is an object of the present invention to provide a processing method and a processing apparatus for a metal component, which can practically activates a surface of the metal component by using a liquid organic solvent.

Solution to Problem

The present invention is a processing method for a metal component by using a processing furnace, comprising: a metal-component loading step of loading a metal component into a processing furnace; an activation atmospheric-gas introducing step of introducing an activation atmospheric gas into the processing furnace; a first heating step of heating the activation atmospheric gas in the processing furnace to a first temperature; a main atmospheric-gas introducing step of introducing a nitriding atmospheric gas or a nitrocarburizing atmospheric gas into the processing furnace, after the first heating step; and a second heating step of heating the nitriding atmospheric gas or the nitrocarburizing atmospheric gas in the processing furnace to a second temperature in order to nitride or nitrocarburize the metal component; wherein during the activation atmospheric-gas introducing step, the activation atmospheric gas is introduced into the processing furnace through a pipe for introducing the activation atmospheric gas; during a partial period of the first heating step, the activation atmospheric-gas introducing step is simultaneously carried out; and during the partial period, a liquid organic solvent is introduced intermittently a plurality of times into the pipe for introducing the activation atmospheric gas.

According to the present invention, by introducing a liquid organic solvent (which can be a chloride compound in addition to a carbon compound and/or a carbon nitrogen compound) into a pipe for introducing an activation atmosphere gas while the activation atmosphere gas continues to be introduced into a processing furnace, the occurrence of a situation in which the organic solvent vaporizes and flows back can be effectively inhibited even when the temperature (first temperature) of the processing furnace is high.

In addition, according to the present invention, by introducing a liquid organic solvent intermittently a plurality of times, it is possible to achieve introduction of an appropriate amount thereof at timings suitable for a status in the processing furnace.

For example, the first temperature is within a range of from 400° C. to 500° C.

According to this temperature range, activation of the metal component can suitably progress, while the occurrence of a situation in which the organic solvent vaporizes and flows back can be effectively inhibited.

In addition, for example, the activation atmospheric gas includes an ammonia gas, and the organic solvent is composed of a compound including at least one type of hydrocarbon.

In this case, HCN is produced during a reaction process starting with a thermal decomposition of the organic solvent, and the produced HCN can reduce the passivation film on the surface of the metal component and can activate the surface effectively.

Specifically, for example, the organic solvent is composed of any one of formamide, xylene and toluene.

In this case, by using an actual production furnace, the present inventor has confirmed that it is effective to adopt a condition wherein the organic solvent is introduced two times to six times, 10 minutes or more apart, and wherein 10 ml to 80 ml of the organic solvent is introduced per time at a substantially uniform speed during a course of 1 second to two minutes (preferably, 10 second to two minutes).

Alternatively, for example, the activation atmospheric gas includes an ammonia gas, and the organic solvent is composed of a compound including at least one type of chlorine.

In this case, HCl is produced during a reaction process starting with a thermal decomposition of the organic solvent, and the produced HCN can reduce the passivation film on the surface of the metal component and can activate the surface effectively.

Specifically, for example, the organic solvent is composed of any one of trichloroethylene, tetrachloroethylene and tetrachloroethane.

In this case, by using an actual production furnace, the present inventor has confirmed that it is effective to adopt a condition wherein the organic solvent is introduced two times to six times, 10 minutes or more apart, and wherein 10 ml to 80 ml of the organic solvent is introduced per time at a substantially uniform speed during a course of 1 second to two minutes (preferably, 10 second to two minutes).

Herein, at least at the time of filing the present application, an invention that does not include the condition wherein the liquid organic solvent is introduced into the pipe for introducing the activation atmospheric gas is also claimed to be protected.

That is to say, the present invention is a processing method for a metal component by using a processing furnace, comprising: a metal-component loading step of loading a metal component into a processing furnace; an activation atmospheric-gas introducing step of introducing an activation atmospheric gas into the processing furnace; a first heating step of heating the activation atmospheric gas in the processing furnace to a first temperature; a main atmospheric-gas introducing step of introducing a nitriding atmospheric gas or a nitrocarburizing atmospheric gas into the processing furnace, after the first heating step; and a second heating step of heating the nitriding atmospheric gas or the nitrocarburizing atmospheric gas in the processing furnace to a second temperature in order to nitride or nitrocarburize the metal component; wherein during the first heating step, a liquid organic solvent is introduced intermittently a plurality of times into the processing furnace.

According to the above invention, by introducing a liquid organic solvent intermittently a plurality of times, it is possible to achieve introduction of an appropriate amount thereof at timings suitable for a status in the processing furnace.

In addition, the present invention is a processing apparatus for a metal component, comprising: a processing furnace; a metal-component loading mechanism for loading a metal component into the processing furnace; an atmospheric-gas introduction pipe arranged to communicate with an inside of the processing furnace for introducing an atmospheric gas into the processing furnace; an organic-solvent introduction unit for introducing a liquid organic solvent intermittently a plurality of times into the atmospheric-gas introduction pipe; and a heating unit for heating the atmospheric gas in the processing furnace to a predetermined temperature.

According to the present invention, by introducing a liquid organic solvent (which can be a chloride compound in addition to a carbon compound and/or a carbon nitrogen compound) into a pipe for introducing an atmosphere gas while the atmosphere gas continues to be introduced into a processing furnace, the occurrence of a situation in which the organic solvent vaporizes and flows back can be effectively inhibited even when the temperature of the processing furnace is high.

In addition, according to the present invention, by introducing a liquid organic solvent intermittently a plurality of times, it is possible to achieve introduction of an appropriate amount thereof at timings suitable for a status in the processing furnace.

It is preferable that the organic-solvent introduction unit has a check valve on an upstream side of the atmospheric-gas introduction pipe.

According to this manner, it is prevented that the organic solvent flows back. Thus, it is possible to achieve introduction of an appropriate amount thereof more accurately. In addition, since undesired vaporization of the organic solvent is inhibited, a general product can be used as the check valve.

In addition, it is preferable that a dehumidifier is provided on a way of the atmospheric-gas introduction pipe.

According to this manner, it is effectively prevented that characteristics of the metal component is deteriorated by moisture that may be contained in the atmospheric gas.

In addition, it is preferable that the metal-component loading mechanism is configured to load and unload the metal component with respect to the processing furnace in a horizontal direction.

According to this manner, even if precipitation of the organic solvent occurs, a risk of contact between precipitate and the metal component is smaller, which is preferable. (In a manner wherein a metal component is loaded and unloaded from above a furnace, a risk of contact between precipitate and the metal component is larger around a furnace opening.)

In addition, it is preferable that the atmospheric gas is an activation atmospheric gas, and that a second processing furnace for a nitriding treatment or a nitrocarburizing treatment is provided separately from the processing furnace.

According to this manner, since the activation treatment and the nitriding or nitrocarburizing treatment can be performed in the separate processing furnaces, there is no risk of precipitation of the organic solvent during the nitriding or nitrocarburizing treatment. In addition, the nitriding or nitrocarburizing treatment for the current metal component and the activation treatment for the next metal component can be performed simultaneously, which can increase productivity (the processing furnace for the nitriding or nitrocarburizing treatment does not require the introduction of the organic solvent, which can result in reduced costs compared to a case wherein the same two processing apparatuses are simply prepared).

At least at the time of filing the present application, an invention that does not include the condition wherein the liquid organic solvent is introduced into the pipe for introducing the atmospheric gas is also claimed to be protected.

That is to say, the present invention is a processing apparatus for a metal component, comprising: a processing furnace; a metal-component loading mechanism for loading a metal component into the processing furnace; an atmospheric-gas introduction pipe arranged to communicate with an inside of the processing furnace for introducing an atmospheric gas into the processing furnace; an organic-solvent introduction unit for introducing a liquid organic solvent intermittently a plurality of times into the processing furnace, and a heating unit for heating the atmospheric gas in the processing furnace to a predetermined temperature.

According to the above invention, by introducing a liquid organic solvent intermittently a plurality of times, it is possible to achieve introduction of an appropriate amount thereof at timings suitable for a status in the processing furnace.

Advantageous Effects of Invention

According to the present invention, by introducing a liquid organic solvent intermittently a plurality of times, it is possible to achieve introduction of an appropriate amount thereof at timings suitable for a status in the processing furnace.

According to one aspect of the present invention, by introducing a liquid organic solvent (which can be a chloride compound in addition to a carbon compound and/or a carbon nitrogen compound) into a pipe for introducing an atmosphere gas while the atmosphere gas continues to be introduced into a processing furnace, the occurrence of a situation in which the organic solvent vaporizes and flows back can be effectively inhibited even when the temperature of the processing furnace is high.

DESCRIPTION OF EMBODIMENTS

Figure 1:
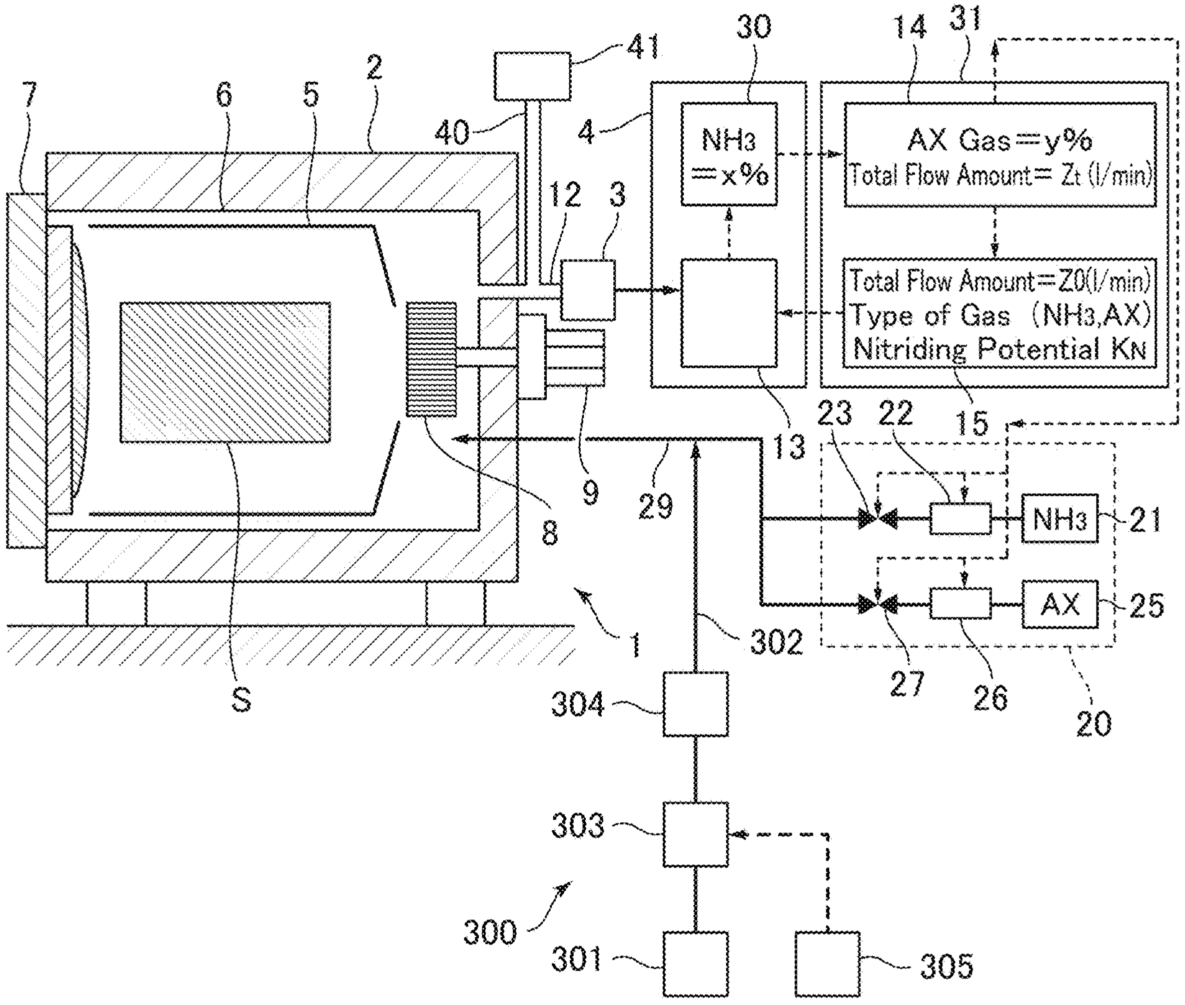
FIG. 1 is a schematic view showing a processing apparatus for a metal component according to a first embodiment of the present invention.

FIG. 1 is a schematic view showing a processing apparatus 1 (nitriding treatment apparatus) for a metal component according to a first embodiment of the present invention. As shown in FIG. 1, the processing apparatus 1 of the present embodiment includes a circulation type of processing furnace 2. As gases to be introduced into the circulation type of processing furnace 2, only two kinds of gases, i.e., only an ammonia gas and an ammonia decomposition gas are used. The ammonia decomposition gas is a gas called AX gas, and is a mixed gas composed of nitrogen and hydrogen in a ratio of 1:3.

Summary of Processing Furnace 2

Figure 2:
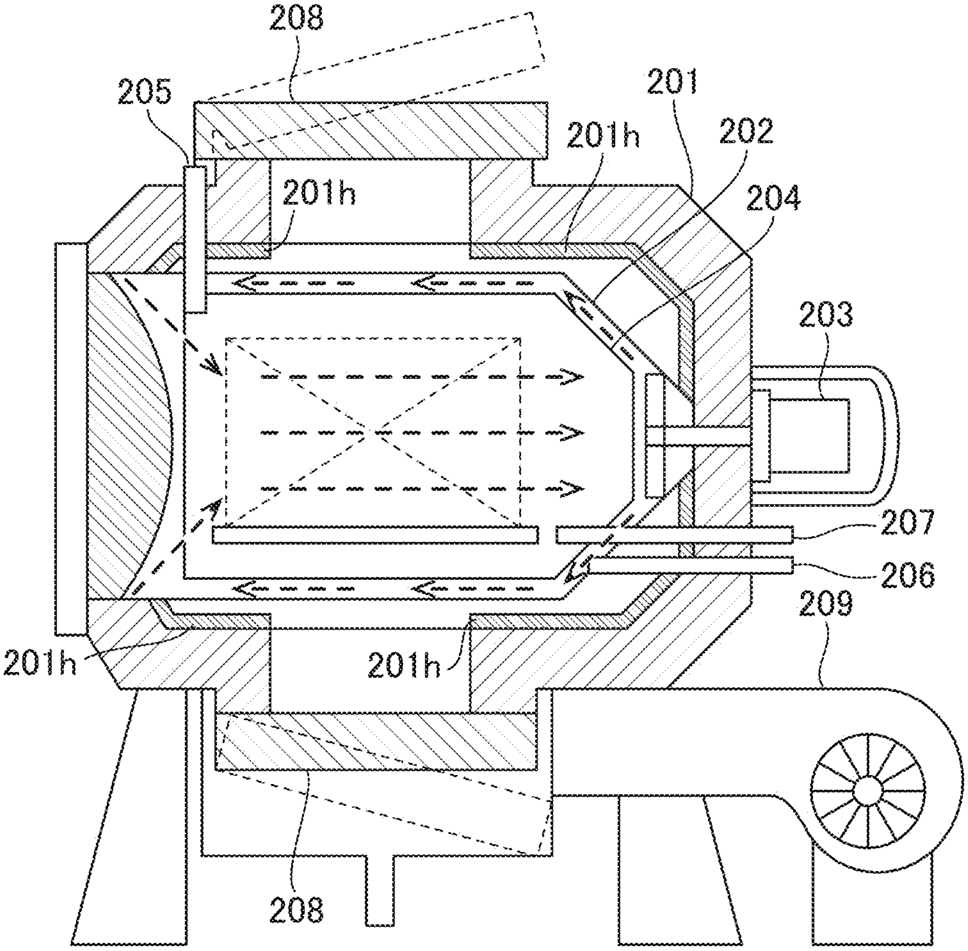
FIG. 2 is a schematic cross-sectional view of a circulation type of processing furnace (horizontal gas nitriding furnace)

An example of a cross-sectional structure for the circulation type of processing furnace 2 is shown in FIG. 2. In FIG. 2, a cylinder 202 called a retort is arranged in a furnace wall (called a bell) which a heater (heating unit) 201*h* has been built in. In addition, another cylinder 204 (ϕ700 mm×1000 mm) called an internal retort is arranged in the cylinder 202. (In FIG. 2, the heater 201*h* is conceptually shown. An actual arrangement manner thereof may be various.) The Introduction gas(es) supplied from a gas introduction pipe 205 passes around the metal component(s) which is a work, and then circulates through a space between the two cylinders 202, 204 by action of a stirring fan 203, as shown by arrows in FIG. 2. An exhaust device with a flare is designated by a reference sign 206. A thermocouple is designated by a reference sign 207. A lid for a cooling operation is designated by a reference sign 208. A fan for a cooling operation is designated by a reference sign 209. The circulation type of processing furnace 2 is also called a horizontal gas nitriding furnace, and the structure thereof is known per se.

(Summary of Metal Component S)

For example, a metal component S is made of stainless steel or heat-resistant steel. For example, the metal component S is a unison ring or an internal crank, which are turbocharger parts for automobiles, or an engine valve for automobiles, or the like. However, in the following examples, a sheet of SUS304 (50 mm×50 mm×1 mm) and a sheet of SUS301S (50 mm×50 mm×1 mm) are used.

(Basic Structure of Processing Apparatus 1)

As shown in FIG. 1, the processing furnace 2 of the processing apparatus 1 of the present embodiment includes: a furnace opening/closing lid 7 (a metal-component loading mechanism), a stirring fan 8, a stirring-fan drive motor 9, an atmospheric gas concentration detector 3, a nitriding potential adjustor 4, a programmable logic controller 31, and a furnace introduction gas supplier 20.

The stirring fan 8 is disposed in the processing furnace 2 and configured to rotate in the processing furnace 2 in order to stir atmospheric gases in the processing furnace 2. The stirring-fan drive motor 9 is connected to the stirring fan 8 and configured to cause the stirring fan 8 to rotate at an arbitrary rotation speed.

The atmospheric gas concentration detector 3 is composed of a sensor capable of detecting a hydrogen concentration or an ammonia concentration in the processing furnace 2 as an in-furnace atmospheric gas concentration. A main body of the sensor communicates with an inside of the processing furnace 2 via an atmospheric gas detection pipe 12. In the present embodiment, the atmospheric gas detection pipe 12 is formed as a path that directly communicates the sensor main body of the atmospheric gas concentration detector 3 and the processing furnace 2. A furnace-gas exhaust pipe 40 is connected in the middle of the atmospheric gas detection pipe 12. The furnace-gas exhaust pipe 40 leads to an exhaust-gas combustion decomposition unit 41. According to this manner, the atmospheric gas is distributed between the gas to be exhausted and the gas to be supplied to the atmospheric gas concentration detector 3.

In addition, after detecting the in-furnace atmospheric gas concentration, the atmospheric gas concentration detector 3 is configured to output an information signal including the detected concentration to the nitriding potential adjustor 4.

The nitriding potential adjuster 4 includes an in-furnace nitriding potential calculator 13 and a gas flow rate output adjustor 30. The programmable logic controller 31 includes a gas introduction-amount controller 14 and a parameter setting device 15.

The in-furnace nitriding potential calculator 13 is configured to calculate a nitriding potential in the processing furnace 2 based on the hydrogen concentration or the ammonia concentration detected by the atmospheric gas concentration detector 3. Specifically, calculation formulas for the nitriding potential are programmed dependent on the actual furnace introduction gases, and incorporated in the in-furnace nitriding potential calculator 13, so that the nitriding potential is calculated from the value of the in-furnace atmospheric gas concentration.

For example, the parameter setting device 15 is composed of a touch panel. Through the parameter setting device 15, a total amount (flow rate) of the gases to be introduced into the furnace, a type of each of the gases, a processing temperature, a target nitriding potential, and the like can be set and inputted respectively. The set and inputted setting parameter values are transferred to the gas flow rate output adjustor 30.

The gas flow rate output adjustor 30 is configured to perform a control method in which respective gas introduction amounts of the ammonia gas and the ammonia decomposition gas are input values, the nitriding potential calculated by the in-furnace nitriding potential calculator 13 is an output value, and the target nitriding potential (the set nitriding potential) is a target value. More specifically, for example, the control method is performed in such a manner that a ratio between the introduction amount of the ammonia gas and the introduction amount of the ammonia decomposition gas is changed while keeping the total amount of the introduction amount of the ammonia gas and the introduction amount of the ammonia decomposition gas constant. The output values of the gas flow rate output adjustor 30 are transferred to the gas introduction-amount controller 14.

The gas introduction amount controller 14 is configured to transmit a control signal to a first supply amount controller 22 (specifically, a mass flow controller) for the ammonia gas and a control signal to a second supply amount controller 26 (specifically, a mass flow controller) for the ammonia decomposition gas, respectively, in order to achieve the introduction amounts of the two gases.

The furnace introduction gas supplier 20 of the present embodiment includes a first furnace introduction gas supplier 21 for the ammonia gas, the first supply amount controller 22 and a first supply valve 23. In addition, the furnace introduction gas supplier 20 of the present embodiment includes a second furnace introduction gas supplier 25 for the ammonia decomposition gas (AX gas), the second supply amount controller 26 and a second supply valve 27.

In the present embodiment, the ammonia gas and the ammonia decomposition gas are mixed in a furnace gas introduction pipe 29 before entering the processing furnace 2.

The first furnace introduction gas supplier 21 is formed by, for example, a tank filled with a first furnace introduction gas (in this example, the ammonia gas).

The first supply amount controller 22 is formed by a mass flow controller, and is interposed between the first furnace introduction gas supplier 21 and the first supply valve 23. An opening degree of the first supply amount controller 22 changes according to the control signal outputted from the gas introduction amount controller 14. In addition, the first supply amount controller 22 is configured to detect a supply amount from the first furnace introduction gas supplier 21 to the first supply valve 23, and output an information signal including the detected supply amount to the gas introduction amount controller 14. This information signal can be used for correction or the like of the control performed by the gas introduction amount controller 14.

The first supply valve 23 is formed by an electromagnetic valve configured to switch between opened and closed states according to a control signal outputted from the gas introduction amount controller 14, and is provided on a downstream side of the first supply amount controller 22.

The second furnace introduction gas supplier 25 is formed by, for example, a tank filled with a second furnace introduction gas (in this example, the ammonia decomposition gas). Alternatively, the second furnace introduction gas supplier 25 is a pipe arranged from a thermal decomposition furnace that thermally decomposes an ammonia gas to produce an ammonia decomposition gas.

The second supply amount controller 26 is formed by a mass flow controller, and is interposed between the second furnace introduction gas supplier 25 and the second supply valve 27. An opening degree of the second supply amount controller 26 changes according to the control signal outputted from the gas introduction amount controller 14. In addition, the second supply amount controller 26 is configured to detect a supply amount from the second furnace introduction gas supplier 25 to the second supply valve 27, and output an information signal including the detected supply amount to the gas introduction amount controller 14. This information signal can be used for correction or the like of the control performed by the gas introduction amount controller 14.

The second supply valve 27 is formed by an electromagnetic valve configured to switch between opened and closed states according to a control signal outputted from the gas introduction amount controller 14, and is provided on a downstream side of the second supply amount controller 26.

The processing apparatus 1 of the present embodiment is capable of introducing a first furnace introduction gas (ammonia gas) and a second furnace introduction gas (ammonia decomposition gas) into the processing furnace 2 as an activation atmosphere gas to activate the surface of the metal component S, as a pre-treatment step prior to the nitriding treatment. During the pre-treatment step, the activation atmosphere gas in the processing furnace 2 can be heated by the heater 201*h* to a first temperature, whose specific examples will be described later (for example, 350° C. to 550° C.).

After the pre-treatment step, the processing apparatus 1 of the present embodiment can introduce the first furnace introduction gas (ammonia gas) and the second furnace introduction gas (AX gas) into the processing furnace 2 as a nitriding atmosphere gas while performing a feedback control, in order to nitride and harden the surface of the metal component S. During the nitriding treatment, the nitriding atmosphere gas in the processing furnace 2 can be heated by the heater 201*h* to a second temperature, whose specific examples will be described later (for example, 520° C. to 650° C.).

(New Feature of Processing Apparatus 1)

As a new feature, the processing apparatus 1 of the present embodiment includes an organic solvent introduction unit 300 configured to introduce a liquid organic solvent intermittently a plurality of times into the furnace gas introduction pipe 29 (an atmospheric-gas introduction pipe).

The organic solvent introduction unit 300 includes: a container (tank) 301 filled with an organic solvent (whose specific examples are described below), an organic solvent introduction pipe 302 extending from the container 301 to an inside of the furnace gas introduction pipe 29, a pump 303 provided in the middle of the organic solvent introduction pipe 302 and configured to feed the organic solvent in the container 301 toward the furnace gas introduction pipe 29, and a check valve 304 provided on a downstream side of the pump 303.

The pump 303 is configured to feed the organic solvent intermittently a plurality of times at predetermined intervals (for example, 0 to 120 minutes apart) toward the furnace gas introduction pipe 29, in such a manner that a predetermined amount (for example, 0 to 100 ml) of the organic solvent is introduced at a predetermined feeding speed (for example, 0 to 5000 ml/min) per time.

Such operational conditions of the pump 303 are controlled by an organic solvent introduction controller 305. Specifically, in the present embodiment, the organic solvent is introduced two times to six times, 10 minutes or more apart, wherein 10 ml to 80 ml of the organic solvent is introduced per time at a substantially uniform speed during a course of 1 second to two minutes (preferably, 10 second to two minutes).

A tip end of the organic solvent introduction pipe 302 (for example, a cylindrical pipe of 03 mm) penetrates a wall of the furnace gas introduction pipe 29 (for example, a cylindrical pipe of 027 mm) at a right angle, and extends into an inside of the furnace gas introduction pipe 29 (for example, protrudes toward a central axis by about 3 mm) (the above exemplary dimensions may vary depending on the size of the processing furnace 2). The furnace gas introduction pipe 29 extends into an inside of the processing furnace 2. A tip end of the furnace gas introduction pipe 29 has an inclined surface (about 45° inclined surface) (the shorter end is located below and the sharpened end is located above), while the tip end of the organic solvent introduction pipe 302 has a shape which has been cut by a plane perpendicular to an axis of the organic solvent introduction pipe 302.

The check valve 304 is a general-purpose check valve for liquid media. In the present embodiment, a risk of undesired vaporization of the liquid organic solvent is extremely small, so there is no special specifications required.

(Operation of Processing Apparatus 1: Pre-Treatment)

Next, an operation of the processing apparatus 1 of the present embodiment is explained. First, a metal component S as a work to be processed is loaded into the circular type of processing furnace 2 in a horizontal direction through the furnace opening/closing lid 7 (metal-component loading mechanism). Thereafter, the circular type of processing furnace 2 is heated by the heater 201*h*.

Thereafter, the ammonia gas and the ammonia decomposition gas are introduced into the processing furnace 2 through the furnace gas introduction pipe 29 from the furnace introduction gas supplier 20 according to their respective set introduction amounts, as an activation atmospheric gas. These set introduction amounts can be set and inputted by the parameter setting device 15, and can be controlled by the first supply amount controller 22 (mass flow controller) and the second supply amount controller 26 (mass flow controller). Furthermore, the stirring fan drive motor 9 is driven and thus the stirring fan 8 rotates to stir the atmospheric gas in the processing furnace 2.

On the other hand, the organic solvent introduction unit 300 introduces (feeds) a liquid organic solvent intermittently a plurality of times into the furnace gas introduction pipe 29 (atmospheric gas introduction pipe) while the furnace gas introduction pipe 29 continues to introduce the activation atmospheric gas (the ammonia gas and the ammonia decomposition gas) into the processing furnace 2. Herein, the conditions for introducing the organic solvent by the organic solvent introduction unit 300 can be set and inputted by the parameter setting device 15, and can be controlled by the pump 303.

The organic solvent in a liquid state introduced into the furnace gas introduction pipe 29 (atmospheric gas introduction pipe) reaches the processing furnace 2 as if being pushed by the activation atmosphere gas (the ammonia gas and the ammonia decomposition gas) while maintaining the liquid state. Then, in the processing furnace 2, the organic solvent vaporizes and is thermally decomposed.

According to the pre-treatment as described above, the surface of the metal component S can be activated. Specifically, when the organic solvent is composed of a compound including at least one type of hydrocarbon, HCN is produced during a reaction process starting with a thermal decomposition of the organic solvent, and the produced HCN can reduce a passivation film on the surface of the metal component S and can activate the surface effectively. Alternatively, when the organic solvent is composed of a compound including at least one type of chlorine, HCl is produced during a reaction process starting with a thermal decomposition of the organic solvent, and the produced HCN can reduce a passivation film on the surface of the metal component S and can activate the surface effectively.

In particular, since the organic solvent is introduced (fed) intermittently a plurality of times, the organic solvent is additionally introduced (fed) in the middle of the pre-treatment, which remarkably enhances the effects of introducing the organic solvent, i.e. the activation effects on the surface of the metal member S.

(Operation of Processing Apparatus 1: Nitriding-Treatment)

Thereafter, the circular type of processing furnace 2 is heated by the heater 201*h* to a desired nitriding-treatment temperature. Herein, in the present embodiment, the activation atmosphere gas (the ammonia gas and the ammonia decomposition gas) continues to be introduced into the processing furnace 2 (the kinds of the gases are kept the same, but the introduction amounts thereof are changed). Specifically, the mixed gas of the ammonia gas and the ammonia decomposition gas is introduced into the processing furnace 2 from the furnace introduction gas supplier 20 according to their respective set initial introduction amounts for the nitriding treatment. These set initial introduction amounts can be also set and inputted by the parameter setting device 15, and can be also controlled by the first supply amount controller 22 (mass flow controller) and the second supply amount controller 26 (mass flow controller). Furthermore, the stirring fan drive motor 9 is driven and thus the stirring fan 8 rotates to stir the atmospheric gas in the processing furnace 2.

The in-furnace nitriding potential calculator 13 of the nitriding potential adjustor 4 calculates an in-furnace nitriding potential (which is initially an extremely high value (since no hydrogen gas exists in the furnace), but decreases as decomposition of the ammonia gas (generation of the hydrogen gas) proceeds) and judges whether the calculated value has dropped lower than the sum of the target nitriding potential and a standard margin. This standard margin can also be set and inputted by the parameter setting device 15.

When it is determined that the calculated value of the in-furnace nitriding potential has dropped lower than the sum of the target nitriding potential and the standard margin, the nitriding potential adjustor 4 starts to control an introduction amount of each of the furnace introduction gases via the gas introduction amount controller 14.

The in-furnace nitriding potential calculator 13 of the nitriding potential adjustor 4 calculates the in-furnace nitriding potential based on the inputted hydrogen concentration signal or ammonia concentration signal. Then, the gas flow rate output adjustor 30 performs the PID control method in which the introduction amounts of the furnace introduction gases are input values, the nitriding potential calculated by the in-furnace nitriding potential calculator 13 is an output value, and the target nitriding potential (the set nitriding potential) is a target value. Specifically, in the present PID control method, for example, a ratio between the introduction amount of the ammonia gas and the introduction amount of the ammonia decomposition gas is changed while keeping the total amount of the introduction amount of the ammonia gas and the introduction amount of the ammonia decomposition gas constant. In the present PID control method, the setting parameter values that have been set and inputted by the parameter setting device 15 are used. For example, the setting parameter values are prepared differently depending on values of the target nitriding potential.

Then, the gas flow rate output adjustor 30 controls the respective introduction amounts of the furnace introduction gases as a result of the PID control method. Specifically, the gas flow rate output adjustor 30 determines the introduction amounts of the respective gases, and the output values from the gas flow rate output adjustor 30 are transferred to the gas introduction amount controller 14.

The gas introduction amount controller 14 transmits a control signal to the first supply amount controller 22 for the ammonia gas and a control signal to the second supply amount controller 26 for the ammonia decomposition gas in order to realize the introduction amounts of the respective gases.

According to the control as described above, the in-furnace nitriding potential can be stably controlled in the vicinity of the target nitriding potential. Thereby, the nitriding treatment of the surface of the metal component S can be performed with extremely high quality.

Specific Examples

By using the processing apparatus 1 of the present embodiment, practical effects brought by introduction of the following six types of organic solvents were verified.

Formamide, xylene, and toluene are examples of a compound containing hydrocarbon which is in a liquid state. Trichloroethylene, tetrachloroethylene, and tetrachloroethane are examples of a compound containing chlorine which is in a liquid state.

TABLE 1

Type of Organic Solvent in Examples (Melting point and Boiling point)

| Name | Molecular formula | Melting point | Boiling point |
|---|---|---|---|
| Trichloroethylene | $C_2HCl_3$ | −73° C. | 87.2° C. |
| Tetrachloroethylene | $C_2Cl_4$ | −19° C. | 121° C. |
| Tetrachloroethane | $C_2H_2Cl_4$ | −42.5° C. | 146° C. |
| Formamide | $HCONH_2$ | 2-3° C. | 210° C. |
| Xylene | $C_8H_{10}$ | <−25° C. (Xylene(isomeric mixture)) | 137-140° C. (Xylene(isomeric mixture)) |
| Toluene | $C_7H_8$ | −95° C. | 111° C. |

As the metal component(s) S, five sheets of SUS316 (50 mm×50 mm×1 mm) and five sheets of SUS310S (50 mm×50 mm×1 mm) were loaded, respectively. Each of them was in a vertical posture.

Figure 3:
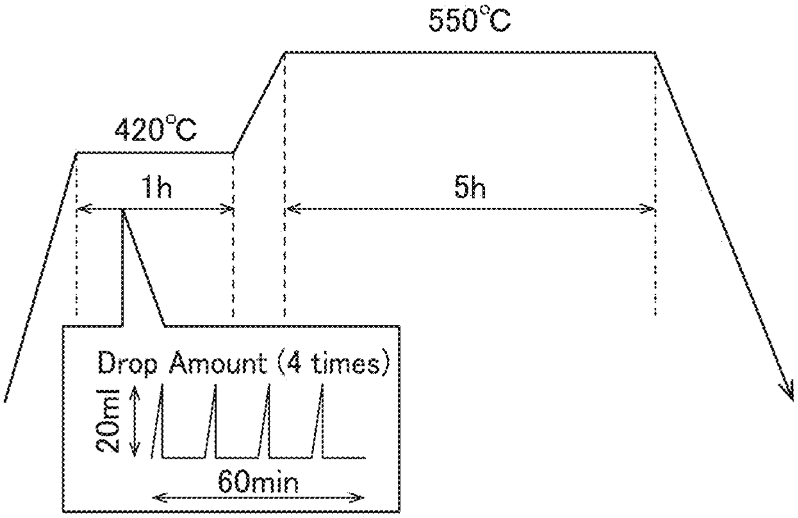
FIG. 3 is a schematic view showing a control example for introducing an organic solvent.

The temperature of the pre-treatment step was set at 420° C. The set introduction amounts of the ammonia gas and the ammonia decomposition gas to be introduced as an activation atmospheric gas were 35 L/min (constant) and 5 L/min (constant), respectively. The holding time (duration) of the pre-treatment step was set to 1 hour, and the organic solvent was fed intermittently four times, 14 minutes apart, wherein 20 ml of the organic solvent is introduced per time at a substantially uniform speed during a course of 1 minute. The first introduction (feeding) of the organic solvent was started when the temperature in the processing furnace 2 reached 420° C. The pre-treatment step was completed when 14 minutes elapsed after the end of the fourth introduction of the organic solvent (see FIG. 3).

Then, the temperature of the nitriding treatment was set at 580° C. The set initial introduction amount of the ammonia gas to be introduced as a nitriding atmospheric gas was 17 L/min, and the set initial introduction amount of the ammonia decomposition gas to be introduced as another nitriding atmospheric gas was 23 L/min. The holding time (duration) of the nitriding treatment was set to 5 hour, the target nitriding potential was set to 1.5, and the introduction amounts of the nitriding atmospheric gases were feedback controlled.

Thereafter, the processing furnace 2 (and the metal component S) was cooled by using the lid for a cooling operation 208 and the fan for a cooling operation 209 (see FIG. 2).

Then, a thickness of a nitride layer formed on the surface of each metal component S was measured by observing the vicinity of the surface in a vertically cut surface of the metal component S with an optical microscope. The average values of the measurements are listed in the following table.

TABLE 2

Results of Examples

| | Type of Solvent | First Heating Temperature Temp. | Time | Atmospheric | Second Heating Temperature Temp. | Time | KN | Average Value of Thickness of Nitride Layer (μm) SUS316 | SUS310S |
|---|---|---|---|---|---|---|---|---|---|
| Example | Formamide | 420° C. | 1 hr | $NH_3$ = 35 L/min AX = 5 L/min | 580° C. | 5 hr | 1.5 | 55 | 5 |
| Example | Xylene | 420° C. | 1 hr | $NH_3$ = 35 L/min AX = 5 L/min | 580° C. | 5 hr | 1.5 | 55 | 8 |
| Example | Toluene | 420° C. | 1 hr | $NH_3$ = 35 L/min AX = 5 L/min | 580° C. | 5 hr | 1.5 | 53 | 3 |
| Example | Trichloroethylene | 420° C. | 1 hr | $NH_3$ = 35 L/min AX = 5 L/min | 580° C. | 5 hr | 1.5 | 55 | 44 |
| Example | Tetrachloroethylene | 420° C. | 1 hr | $NH_3$ = 35 L/min AX = 5 L/min | 580° C. | 5 hr | 1.5 | 56 | 43 |
| Example | Tetrachloroethane | 420° C. | 1 hr | $NH_3$ = 35 L/min AX = 5 L/min | 580° C. | 5 hr | 1.5 | 57 | 45 |

Next, as comparative examples, the introduction manner of the organic solvent was changed, i.e., the organic solvent was fed only once wherein 80 ml of the organic solvent was introduced per time at a substantially uniform speed during a course of 1 minute and the introduction (feeding) of the organic solvent was started when the temperature in the processing furnace 2 reached 420° C. The other conditions were the same as in the above examples. Then, a thickness of a nitride layer formed on the surface of each metal component S was measured by observing the vicinity of the surface in a vertically cut surface of the metal component S with an optical microscope.

The average values of the measurements are listed in the following table.

In addition, in the processing apparatus 1 of the present embodiment as well, it can be said that it is effective to use (distinguish between) the method of using HCN (a carbon compound and/or a carbon nitrogen compound) and the method of using HCl (a chloride component), depending on the grade of steel (see paragraph 0013).

(Verification of Preferable Temperature of Pre-Treatment)

Ease of nitridation (ease of nitrogen atom penetration) in the subsequent nitriding process can vary depending on how high or low the temperature of the pre-treatment step is. The temperature of the pre-treatment step (first temperature) was changed between 300° C. and 550° C., for the sheets of SUS 316 as the metal component(s) S, while the other conditions were the same as in the above examples. Then, a thickness of a nitride layer formed on the surface of each metal component S was measured by observing the vicinity of the surface in a vertically cut surface of the metal component S with an optical microscope. The average values of the measurements are listed in the following table. As seen from Table 4, it is preferable that the temperature of the pre-treatment step is between 400° C. and 500° C.

TABLE 3

Results of Comparison Examples

| | Type of Solvent | First Heating Temperature Temp. | Time | Atmospheric | Second Heating Temperature Temp. | Time | KN | Average Value of Thickness of Nitride Layer (μm) SUS316 | SUS310S |
|---|---|---|---|---|---|---|---|---|---|
| Comparison Example | Formamide | 420° C. | 15 min | $NH_3$ = 35 L/min AX = 5 L/min | 580° C. | 5 hr | 1.5 | 0 | 0 |
| Comparison Example | Xylene | 420° C. | 15 min | $NH_3$ = 35 L/min AX = 5 L/min | 580° C. | 5 hr | 1.5 | 0 | 0 |
| Comparison Example | Toluene | 420° C. | 15 min | $NH_3$ = 35 L/min AX = 5 L/min | 580° C. | 5 hr | 1.5 | 0 | 0 |
| Comparison Example | Trichloroethylene | 420° C. | 15 min | $NH_3$ = 35 L/min AX = 5 L/min | 580° C. | 5 hr | 1.5 | 42 | 21 |
| Comparison Example | Tetrachloroethylene | 420° C. | 15 min | $NH_3$ = 35 L/min AX = 5 L/min | 580° C. | 5 hr | 1.5 | 42 | 20 |
| Example Example | Tetrachloroethane | 420° C. | 15 min | $NH_3$ = 35 L/min AX = 5 L/min | 580° C. | 5 hr | 1.5 | 41 | 21 |

As shown in Tables 2 and 3, regarding SUS316, with respect to all the six types of organic solvents, excellent effects were brought by introducing the organic solvent intermittently a plurality of times.

As shown in Tables 2 and 3, regarding SUS310S, with respect to the three types of organic solvents containing chlorides, excellent effects were brought by introducing the organic solvent intermittently a plurality of times.

TABLE 4

Difference of Nitride Layer Thickness by Pre-Treatment Temperature

| First Heating Temperature | | | Second Heating Temperature | | | Average Value of Thickness of |
|---|---|---|---|---|---|---|
| Temp. | Time | Atmospheric | Temp. | Time | KN | Nitride Layer (μm) |
| 350° C. | 1 hr | $NH_3$ = 40 L/min | 580° C. | 5 hr | 1.5 | 7 μm |
| 400° C. | 1 hr | $NH_3$ = 40 L/min | 580° C. | 5 hr | 1.5 | 64 μm |
| 450° C. | 1 hr | $NH_3$ = 40 L/min | 580° C. | 5 hr | 1.5 | 68 μm |
| 500° C. | 1 hr | $NH_3$ = 40 L/min | 580° C. | 5 hr | 1.5 | 66 μm |
| 550° C. | 1 hr | $NH_3$ = 40 L/min | 580° C. | 5 hr | 1.5 | 26 μm |

(Effects of Processing Apparatus 1)

According to the processing apparatus 1 of the present embodiment as described above, by the organic solvent introduction unit 300 introducing the liquid organic solvent (which can be a chloride compound in addition to a carbon compound and/or a carbon nitrogen compound) into the furnace gas introduction pipe 29 (atmospheric gas introduction pipe) while the activation atmosphere gas (the ammonia gas and the ammonia decomposition gas) continues to be introduced into the processing furnace 2, the occurrence of a situation in which the organic solvent vaporizes and flows back can be effectively inhibited even when the temperature of the processing furnace 2 is high.

Furthermore, according to the processing apparatus 1 of the present embodiment, by the organic solvent introduction unit 300 introducing the liquid organic solvent intermittently a plurality of times, it is possible to achieve introduction of an appropriate amount thereof at timings suitable for a status in the processing furnace 2. Thus, the organic solvent can be additionally introduced in the middle of the pre-treatment, which can remarkably enhance the effects of introducing the organic solvent, i.e. the activation effects on the surface of the metal member S. Specifically, by controlling the pump 303, the organic solvent can be introduced two times to six times, 10 minutes or more apart, wherein 10 ml to 80 ml of the organic solvent can be introduced per time at a substantially uniform speed during a course of 1 second to two minutes.

In addition, according to the processing apparatus 1 of the present embodiment, the organic solvent introduction unit 300 has the check valve 304 on an upstream side of the furnace gas introduction pipe 29 (atmospheric gas introduction pipe). Thereby, it is prevented that the organic solvent flows back, which makes it possible to achieve introduction of an appropriate amount of the organic solvent more accurately.

In addition, according to the processing apparatus 1 of the present embodiment, the metal component S is loaded and unloaded with respect to the processing furnace 2 in a horizontal direction through the furnace opening/closing lid 7. Thereby, even if precipitation of the organic solvent occurs, a risk of contact between precipitate and the metal component S is smaller.

In the processing apparatus 1 of the present embodiment, it is preferable that the pre-treatment temperature (first temperature) is set within a range of from 400° C. to 500° C. According to this temperature range, the activation treatment of the metal component S can suitably progress, while the occurrence of a situation in which the organic solvent vaporizes and flows back can be effectively inhibited.

In the processing apparatus 1 of the present embodiment, for example, the activation atmospheric gas may include an ammonia gas, and the organic solvent may be composed of a compound including at least one type of hydrocarbon. In this case, HCN is produced during a reaction process starting with a thermal decomposition of the organic solvent, and the produced HCN can reduce the passivation film on the surface of the metal component S and can activate the surface effectively. Specifically, for example, the organic solvent is composed of any one of formamide, xylene and toluene. In these cases, by using an actual production furnace, the present inventor has confirmed that it is effective to adopt a condition wherein the organic solvent is introduced two times to six times, 10 minutes or more apart, and wherein 10 ml to 80 ml of the organic solvent is introduced per time at a substantially uniform speed during a course of 1 second to two minutes.

Furthermore, in the processing apparatus 1 of the present embodiment, for example, the activation atmospheric gas may include an ammonia gas, and the organic solvent may be composed of a compound including at least one type of chlorine. In this case, HCl is produced during a reaction process starting with a thermal decomposition of the organic solvent, and the produced HCN can reduce the passivation film on the surface of the metal component S and can activate the surface effectively. Specifically, for example, the organic solvent is composed of any one of trichloroethylene, tetrachloroethylene and tetrachloroethane. In these cases, by using an actual production furnace, the present inventor has confirmed that it is effective to adopt a condition wherein the organic solvent is introduced two times to six times, 10 minutes or more apart, and wherein 10 ml to 80 ml of the organic solvent is introduced per time at a substantially uniform speed during a course of 1 second to two minutes.

(Variants of Processing Apparatus 1)

Figure 4:
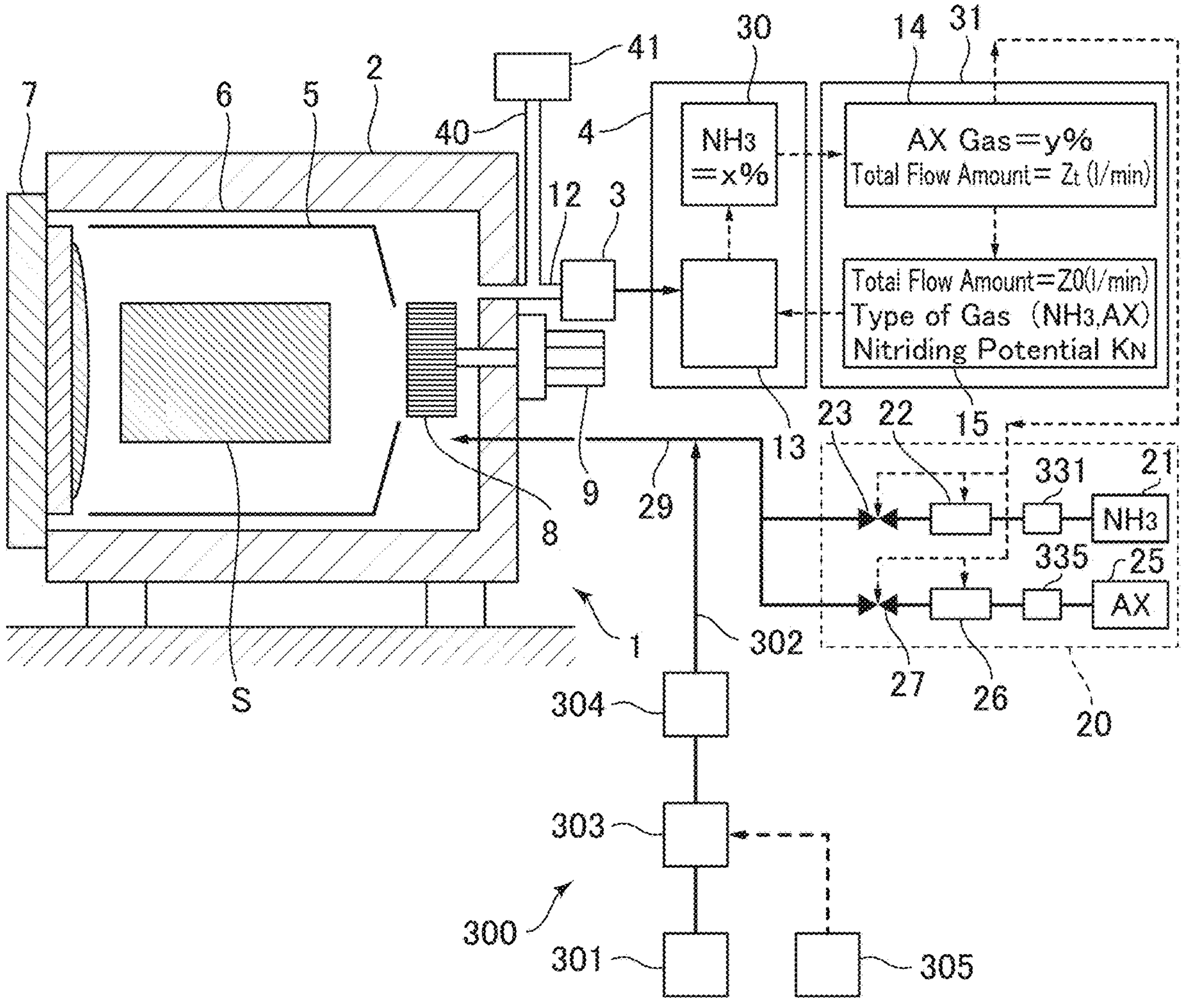
FIG. 4 is a schematic view showing a variant of the processing apparatus for the metal component according to the first embodiment.

FIG. 4 is a schematic view showing a variant of the processing apparatus 1. As shown in FIG. 4, in the present variant, a dehumidifier 331 is provided on an upstream side of the first supply amount controller 22 for the ammonia gas (as an example of on a way of the atmospheric gas introduction pipe), and another dehumidifier 335 is provided on an upstream side of the second supply amount controller 26 for the ammonia decomposition gas (as an example of on a way of the atmospheric gas introduction pipe). When the second furnace introduction gas supplier 25 is a pipe arranged from a thermal decomposition furnace that thermally decomposes an ammonia gas to produce an ammonia decomposition gas, a dehumidifier may be provided on an upstream side of the thermal decomposition furnace (the ammonia gas as a raw material for the ammonia decomposition gas is dehumidified). Furthermore, when an ammonia gas after being dehumidified by a dehumidifier provided on an upstream side of the first supply amount controller 22 is distributed and supplied to the thermal decomposition furnace, this one dehumidifier is enough.

Figure 5:
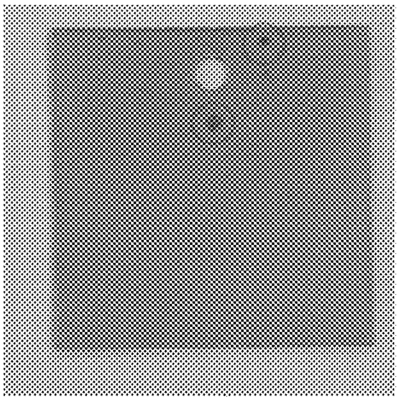
FIG. 5 is a photograph of a circular stain.

According to this variant, it may be effectively prevented that characteristics of the metal component S is deteriorated by moisture that may be contained in the activation atmospheric gas (the ammonia gas and the ammonia decomposition gas). According to the inventor's knowledge, if the amount of moisture is large, circular stains may appear on the metal component S after being nitrided, as shown in FIG. 5 (its appearance may be spoiled).

Figure 6:
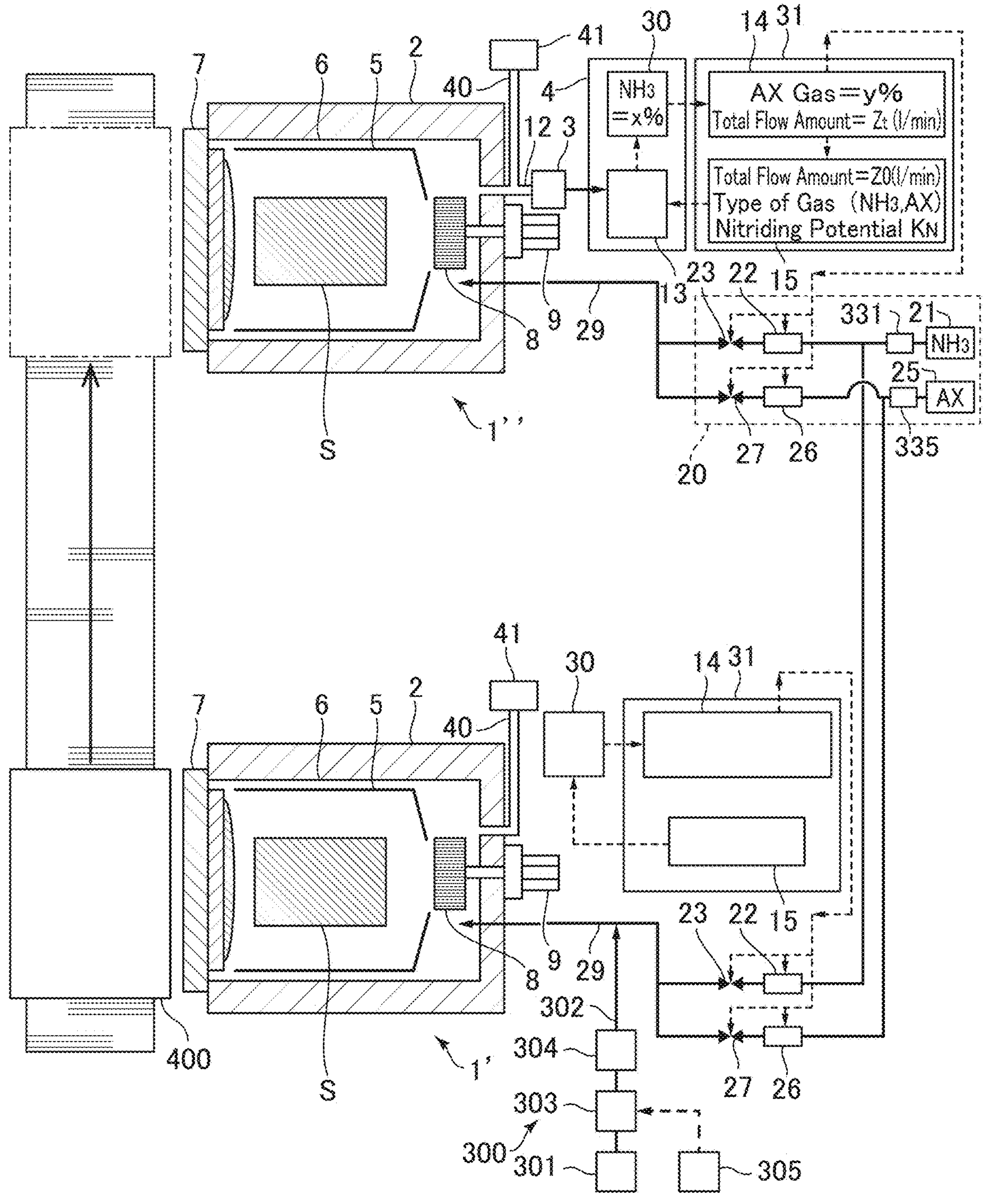
FIG. 6 is a schematic view showing a further variant of the processing apparatus for the metal component according to the first embodiment.

In addition, FIG. 6 is a schematic view showing a further variant of the processing apparatus 1. In the further variant shown in FIG. 6, two processing apparatuses 1', 1" are configured to work together.

The first processing apparatus 1' is used for an activation treatment. Compared to the processing apparatus 1 as described above, the atmospheric gas detection pipe 12, the atmospheric gas concentration detector 3 and the in-furnace nitriding potential calculator 13 may be omitted.

The second processing apparatus 1" is used for a nitriding treatment. Compared to the processing apparatus 1 as described above, the organic solvent introduction unit 300 may be omitted.

In addition, in the further variant, a mobile furnace 400 (a vacuum furnace or an atmospheric gas furnace) for transferring the metal component S that has been pre-treated by the first processing apparatus 1' to the second processing apparatus 1" is provided in a movable manner from an area in the vicinity of the furnace opening/closing lid 7 of the first processing apparatus 1' to another area in the vicinity of the furnace opening/closing lid 7 of the second processing apparatus 1".

In addition, as shown in FIG. 6, the first furnace introduction gas supplier 21 (tank) for the ammonia gas and the second furnace introduction gas supplier 25 (tank or pipe) for the ammonia decomposition gas are common in the two processing apparatuses 1', 1".

According to this variant, since the nitriding treatment is performed in the processing furnace 2 of the second processing apparatuses 1" separately after the activation treatment has been performed in the processing furnace 2 of the first processing apparatuses 1', there is no risk of precipitation of the organic solvent during the nitriding treatment in the processing furnace 2 of the second processing apparatuses 1".

In addition, according to this variant, the nitriding treatment in the processing furnace 2 of the second processing apparatuses 1" and the activation treatment in the processing furnace 2 of the first processing apparatuses 1' for the next metal component S can be performed simultaneously, which can increase productivity.

Second Embodiment

Figure 7:
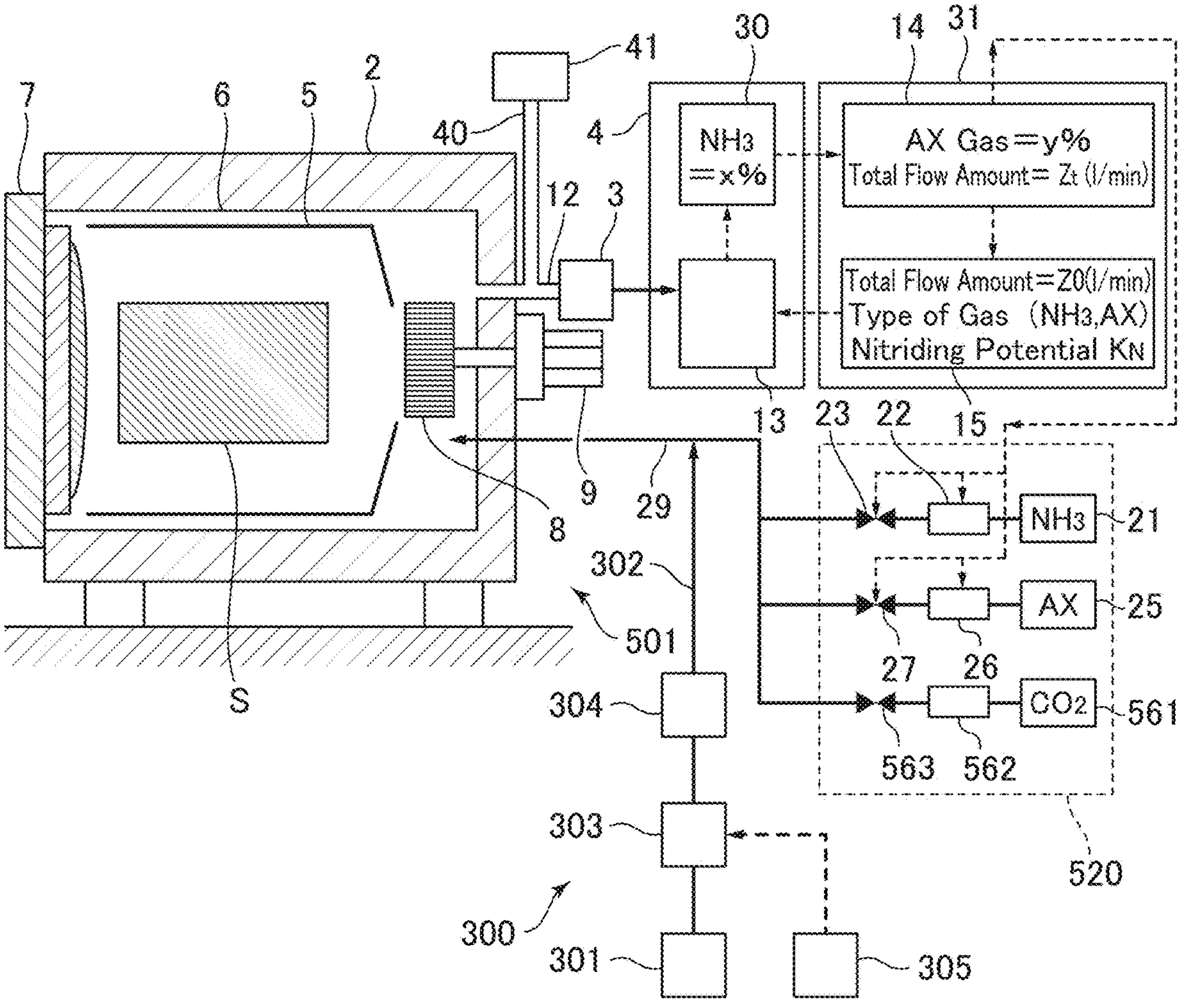
FIG. 7 is a schematic view showing a processing apparatus for a metal component according to a second embodiment of the present invention.

FIG. 7 is a schematic view showing a processing apparatus 501 (nitrocarburizing treatment apparatus) for a metal component according to a second embodiment of the present invention. As shown in FIG. 7, the processing apparatus 501 of the present embodiment also includes the same circulation type of processing furnace 2 as in the processing apparatus 1 of the first embodiment. However, as gases to be introduced into the circulation type of processing furnace 2, three kinds of gases, i.e., an ammonia gas, an ammonia decomposition gas and a carbon dioxide gas are used.

Specifically, in the processing apparatus 501 of the present embodiment, a third furnace introduction gas supplier 561 for the carbon dioxide gas, a third supply amount controller 562 and a third supply valve 563 are added in a furnace introduction gas supplier 520.

The third furnace introduction gas supplier 561 is formed by, for example, a tank filled with a third furnace introduction gas (in this example, the carbon dioxide gas).

The third supply amount controller 562 is also formed by a mass flow controller, and is interposed between the third furnace introduction gas supplier 561 and the third supply valve 563. An opening degree of the third supply amount controller 562 changes according to the control signal outputted from the gas introduction amount controller 14. In addition, the third supply amount controller 562 is configured to detect a supply amount from the third furnace introduction gas supplier 561 to the third supply valve 563, and output an information signal including the detected supply amount to the gas introduction amount controller 14. This information signal can be used for correction or the like of the control performed by the gas introduction amount controller 14.

The third supply valve 563 is formed by an electromagnetic valve configured to switch between opened and closed states according to a control signal outputted from the gas introduction amount controller 14, and is provided on a downstream side of the third supply amount controller 562.

In the present embodiment, the ammonia gas, the ammonia decomposition gas and the carbon dioxide gas are mixed in the furnace gas introduction pipe 29 before entering the processing furnace 2.

The gas flow rate output adjustor 30 is configured to perform a control method in which respective gas introduction amounts of the ammonia gas and the ammonia decomposition gas are input values, the nitriding potential calculated by the in-furnace nitriding potential calculator 13 of the nitriding potential adjustor 4 is an output value, and the target nitriding potential (the set nitriding potential) is a target value (a gas introduction amount of the carbon dioxide gas is kept constant). More specifically, for example, the control method is performed in such a manner that a ratio between the introduction amount of the ammonia gas and the introduction amount of the ammonia decomposition gas is changed while keeping the sum amount of the introduction amount of the ammonia gas and the introduction amount of the ammonia decomposition gas constant. The output values of the gas flow rate output adjustor 30 are transferred to the gas introduction-amount controller 14.

The gas introduction amount controller 14 is configured to transmit a control signal to the first supply amount controller 22 (specifically, a mass flow controller) for the ammonia gas, a control signal to the second supply amount controller 26 (specifically, a mass flow controller) for the ammonia decomposition gas, and a control signal to the third supply amount controller 562 (specifically, a mass flow controller) for the carbon dioxide gas, respectively, in order to achieve the introduction amounts of the three gases.

In addition, the processing apparatus 501 of the present embodiment is also capable of introducing a first furnace introduction gas (ammonia gas) and a second furnace introduction gas (ammonia decomposition gas) into the processing furnace 2 as an activation atmosphere gas to activate the surface of the metal component S, as a pre-treatment step prior to the nitrocarburizing treatment. During the pre-treatment step, the activation atmosphere gas in the processing furnace 2 can be heated by the heater 201*h* to a first temperature, whose specific examples will be described later (for example, 350° C. to 550° C.).

After the pre-treatment step, the processing apparatus 501 of the present embodiment can introduce the first furnace introduction gas (ammonia gas) and the second furnace introduction gas (AX gas) into the processing furnace 2 in accordance with a feedback control (fluctuation control) while maintaining the constant introduction amount of the third furnace introduction gas (carbon dioxide gas), as a nitrocarburizing atmosphere gas in order to nitrocarburize and harden the surface of the metal component S. During the nitrocarburizing treatment, the nitrocarburizing atmosphere gas in the processing furnace 2 can be heated by the heater 201*h* to a second temperature, whose specific examples will be described later (for example, 520° C. to 650° C.).

The other structure of the processing apparatus 501 of the present embodiment is substantially the same as the processing apparatus 1 of the first embodiment. In FIG. 7, the same portions as those of the first embodiment are shown by the same reference signs, and detailed explanation thereof is omitted.

(Summary of Metal Component S)

A metal component S to be nitrocarburized according to the present embodiment is also made of stainless steel or heat-resistant steel. For example, the metal component S is a unison ring or an internal crank, which are turbocharger parts for automobiles, or an engine valve for automobiles, or the like. However, in the following examples, a sheet of SUS304 (50 mm×50 mm×1 mm) and a sheet of SUS301 S (50 mm×50 mm×1 mm) are used.

(Operation of Processing Apparatus 501: Pre-Treatment)

Next, an operation of the processing apparatus 501 of the present embodiment is explained. First, a metal component S as a work to be processed is loaded into the circular type of processing furnace 2 in a horizontal direction through the furnace opening/closing lid 7 (metal-component loading mechanism). Thereafter, the circular type of processing furnace 2 is heated by the heater 201*h*.

Thereafter, the ammonia gas and the ammonia decomposition gas are introduced into the processing furnace 2 through the furnace gas introduction pipe 29 from the furnace introduction gas supplier 520 according to their respective set introduction amounts, as an activation atmospheric gas. These set introduction amounts can be set and inputted by the parameter setting device 15, and can be controlled by the first supply amount controller 22 (mass flow controller) and the second supply amount controller 26 (mass flow controller). Furthermore, the stirring fan drive motor 9 is driven and thus the stirring fan 8 rotates to stir the atmospheric gas in the processing furnace 2.

On the other hand, the organic solvent introduction unit 300 introduces (feeds) a liquid organic solvent intermittently a plurality of times into the furnace gas introduction pipe 29 (atmospheric gas introduction pipe) while the furnace gas introduction pipe 29 continues to introduce the activation atmospheric gas (the ammonia gas and the ammonia decomposition gas) into the processing furnace 2. Herein, the conditions for introducing the organic solvent by the organic solvent introduction unit 300 can be set and inputted by the parameter setting device 15, and can be controlled by the pump 303.

The organic solvent in a liquid state introduced into the furnace gas introduction pipe 29 (atmospheric gas introduction pipe) reaches the processing furnace 2 as if being pushed by the activation atmosphere gas (the ammonia gas and the ammonia decomposition gas) while maintaining the liquid state. Then, in the processing furnace 2, the organic solvent vaporizes and is thermally decomposed.

According to the pre-treatment as described above, the surface of the metal component S can be activated. Specifically, when the organic solvent is composed of a compound including at least one type of hydrocarbon, HCN is produced during a reaction process starting with a thermal decomposition of the organic solvent, and the produced HCN can reduce a passivation film on the surface of the metal component S and can activate the surface effectively. Alternatively, when the organic solvent is composed of a compound including at least one type of chlorine, HCl is produced during a reaction process starting with a thermal decomposition of the organic solvent, and the produced HCN can reduce a passivation film on the surface of the metal component S and can activate the surface effectively.

In particular, since the organic solvent is introduced (fed) intermittently a plurality of times, the organic solvent is additionally introduced (fed) in the middle of the pretreatment, which remarkably enhances the effects of introducing the organic solvent, i.e. the activation effects on the surface of the metal member S.

(Operation of Processing Apparatus 501: Nitrocarburizing-Treatment)

Thereafter, the circular type of processing furnace 2 is heated by the heater 201*h* to a desired nitrocarburizing-treatment temperature. Herein, in the present embodiment, the nitrocarburizing atmosphere gas starts to be introduced into the processing furnace 2. That is to say, the ammonia gas and the ammonia decomposition gas continue to be introduced into the processing furnace 2, but as an introduction of the nitrocarburizing atmospheric gas, while the carbon dioxide gas starts to be introduced into the processing furnace 2. Specifically, the mixed gas of the ammonia gas, the ammonia decomposition gas and the carbon dioxide gas is introduced into the processing furnace 2 from the furnace introduction gas supplier 520 according to their respective set initial introduction amounts for the nitrocarburizing treatment. These set initial introduction amounts can be also set and inputted by the parameter setting device 15, and can be also controlled by the first supply amount controller 22 (mass flow controller), the second supply amount controller 26 (mass flow controller) and the third supply amount controller 562 (mass flow controller). Furthermore, the stirring fan drive motor 9 is driven and thus the stirring fan 8 rotates to stir the atmospheric gas in the processing furnace 2.

The in-furnace nitriding potential calculator 13 of the nitriding potential adjustor 4 calculates an in-furnace nitriding potential (which is initially an extremely high value (since no hydrogen gas exists in the furnace), but decreases as decomposition of the ammonia gas (generation of the hydrogen gas) proceeds) and judges whether the calculated value has dropped lower than the sum of the target nitriding potential and a standard margin. This standard margin can also be set and inputted by the parameter setting device 15.

When it is determined that the calculated value of the in-furnace nitriding potential has dropped lower than the sum of the target nitriding potential and the standard margin, the nitriding potential adjustor 4 starts to control an introduction amount of each of the furnace introduction gases via the gas introduction amount controller 14.

The in-furnace nitriding potential calculator 13 of the nitriding potential adjustor 4 calculates the in-furnace nitriding potential based on the inputted hydrogen concentration signal or ammonia concentration signal. Then, the gas flow rate output 25 adjustor 30 performs the PID control method in which the introduction amounts of the furnace introduction gases are input values, the nitriding potential calculated by the in-furnace nitriding potential calculator 13 is an output value, and the target nitriding potential (the set nitriding potential) is a target value. Specifically, in the present PID control method, for example, a ratio between the introduction amount of the ammonia gas and the introduction amount of the ammonia decomposition gas is changed while keeping the sum amount of the introduction amount of the ammonia gas and the introduction amount of the ammonia decomposition gas constant. In the present PID control method, the setting parameter values that have been set and inputted by the parameter setting device 15 are used. For example, the setting parameter values are prepared differently depending on values of the target nitriding potential.

Then, the gas flow rate output adjustor 30 controls the respective introduction amounts of the furnace introduction gases as a result of the PID control method. Specifically, the gas flow rate output adjustor 30 determines the introduction amounts of the respective gases, and the output values from the gas flow rate output adjustor 30 are transferred to the gas introduction amount controller 14.

The gas introduction amount controller 14 transmits a control signal to the first supply amount controller 22 for the ammonia gas, a control signal to the second supply amount controller 26 for the ammonia decomposition gas, and a control signal to the third supply amount controller 562 for the carbon dioxide gas, respectively, in order to realize the introduction amounts of the respective gases.

According to the control as described above, the in-furnace nitriding potential can be stably controlled in the vicinity of the target nitriding potential. Thereby, the nitrocarburizing treatment of the surface of the metal component S can be performed with extremely high quality.

Specific Examples

By using the processing apparatus 501 of the present embodiment, practical effects brought by introduction of the six types of organic solvents listed in the above Table 1 were verified.

As the metal component(s) S, five sheets of SUS316 (50 mm×50 mm×1 mm) and five sheets of SUS310S (50 mm×50 mm×1 mm) were loaded, respectively. Each of them was in a vertical posture.

The temperature of the pre-treatment step was set at 420° C. The set introduction amounts of the ammonia gas and the ammonia decomposition gas to be introduced as an activation atmospheric gas were 35 L/min (constant) and 5 L/min (constant), respectively. The holding time (duration) of the pre-treatment step was set to 1 hour, and the organic solvent was fed intermittently four times, 14 minutes apart, wherein 20 ml of the organic solvent is introduced per time at a substantially uniform speed during a course of 1 minute. The first introduction (feeding) of the organic solvent was started when the temperature in the processing furnace 2 reached 420° C. The pre-treatment step was completed when 14 minutes elapsed after the end of the fourth introduction of the organic solvent (see FIG. 3).

Then, the temperature of the nitrocarburizing treatment was set at 580° C. The set initial introduction amount of the ammonia gas to be introduced as a nitrocarburizing atmospheric gas was 17 L/min, the set initial introduction amount of the ammonia decomposition gas to be introduced as another nitrocarburizing atmospheric gas was 23 L/min, and the set initial introduction amount of the carbon dioxide gas to be introduced as a further other nitrocarburizing atmospheric gas was 2 L/min. The holding time (duration) of the nitrocarburizing treatment was set to 5 hour, the target nitriding potential was set to 1.5, and the introduction amounts of the nitrocarburizing atmospheric gases were feedback controlled.

Thereafter, the processing furnace 2 (and the metal component S) was cooled by using the lid for a cooling operation 208 and the fan for a cooling operation 209 (see FIG. 2).

Then, a thickness of a nitrocarburized layer formed on the surface of each metal component S was measured by observing the vicinity of the surface in a vertically cut surface of the metal component S with an optical microscope. The average values of the measurements are listed in the following table.

TABLE 5

Results of Examples

| | Type of Solvent | First Heating Temperature: Temp. | Time | Atmospheric | Second Heating Temperature: Temp. | Time | KN | Average Value of Thickness of Nitride Layer (μm): SUS316 | SUS310S |
|---|---|---|---|---|---|---|---|---|---|
| Example | Formamide | 420° C. | 1 hr | $NH_3$ = 33 L/min<br>AX = 5 L/min<br>$CO_2$ = 2 L/min | 580° C. | 5 hr | 1.5 | 55 | 6 |
| Example | Xylene | 420° C. | 1 hr | $NH_3$ = 33 L/min<br>AX = 5 L/min<br>$CO_2$ = 2 L/min | 580° C. | 5 hr | 1.5 | 55 | 8 |
| Example | Toluene | 420° C. | 1 hr | $NH_3$ = 33 L/min<br>AX = 5 L/min<br>$CO_2$ = 2 L/min | 580° C. | 5 hr | 1.5 | 53 | 4 |
| Example | Trichloroethylene | 420° C. | 1 hr | $NH_3$ = 33 L/min<br>AX = 5 L/min<br>$CO_2$ = 2 L/min | 580° C. | 5 hr | 1.5 | 55 | 44 |
| Example | Tetrachloroethylene | 420° C. | 1 hr | $NH_3$ = 33 L/min<br>AX = 5 L/min<br>$CO_2$ = 2 L/min | 580° C. | 5 hr | 1.5 | 56 | 43 |
| Example | Tetrachloroethane | 420° C. | 1 hr | $NH_3$ = 33 L/min<br>AX = 5 L/min<br>$CO_2$ = 2 L/min | 580° C. | 5 hr | 1.5 | 57 | 45 |

Next, as comparative examples, the introduction manner of the organic solvent was changed, i.e., the organic solvent was fed only once wherein 80 ml of the organic solvent was introduced per time at a substantially uniform speed during a course of 1 minute and the introduction (feeding) of the organic solvent was started when the temperature in the processing furnace 2 reached 420° C.

The other conditions were the same as in the above examples. Then, a thickness of a nitrocarburized layer formed on the surface of each metal component S was measured by observing the vicinity of the surface in a vertically cut surface of the metal component S with an optical microscope. The average values of the measurements are listed in the following table.

TABLE 6

Results of Comparison Examples

| | | First Heating Temperature | | | Second Heating Temperature | | | Average Value of Thickness of Nitride Layer (μm) | |
|---|---|---|---|---|---|---|---|---|---|
| | Type of Solvent | Temp. | Time | Atmospheric | Temp. | Time | KN | SUS316 | SUS310S |
| Comparison Example | Formamide | 420° C. | 15 min | $NH_3$ = 33 L/min AX = 5 L/min $CO_2$ = 2 L/min | 580° C. | 5 hr | 1.5 | 0 | 0 |
| Comparison Example | Xylene | 420° C. | 15 min | $NH_3$ = 33 L/min AX = 5 L/min $CO_2$ = 2 L/min | 580° C. | 5 hr | 1.5 | 0 | 0 |
| Comparison Example | Toluene | 420° C. | 15 min | $NH_3$ = 33 L/min AX = 5 L/min $CO_2$ = 2 L/min | 580° C. | 5 hr | 1.5 | 0 | 0 |
| Comparison Example | Trichloroethylene | 420° C. | 15 min | $NH_3$ = 33 L/min AX = 5 L/min $CO_2$ = 2 L/min | 580° C. | 5 hr | 1.5 | 43 | 21 |
| Comparison Example | Tetrachloroethylene | 420° C. | 15 min | $NH_3$ = 33 L/min AX = 5 L/min $CO_2$ = 2 L/min | 580° C. | 5 hr | 1.5 | 42 | 21 |
| Example Example | Tetrachloroethane | 420° C. | 15 min | $NH_3$ = 33 L/min AX = 5 L/min $CO_2$ = 2 L/min | 580° C. | 5 hr | 1.5 | 42 | 22 |

As shown in Tables 5 and 6, regarding SUS316, with respect to all the six types of organic solvents, excellent effects were brought by introducing the organic solvent intermittently a plurality of times.

As shown in Tables 5 and 6, regarding SUS310S, with respect to the three types of organic solvents containing chlorides, excellent effects were brought by introducing the organic solvent intermittently a plurality of times.

In addition, in the processing apparatus 501 of the present embodiment as well, it can be said that it is effective to use (distinguish between) the method of using HCN (a carbon compound and/or a carbon nitrogen compound) and the method of using HCl (a chloride component), depending on the grade of steel (see paragraph 0013).

(Effects of Processing Apparatus 501)

According to the processing apparatus 501 of the present embodiment as described above as well, by the organic solvent introduction unit 300 introducing the liquid organic solvent (which can be a chloride compound in addition to a carbon compound and/or a carbon nitrogen compound) into the furnace gas introduction pipe 29 (atmospheric gas introduction pipe) while the activation atmosphere gas (the ammonia gas and the ammonia decomposition gas) continues to be introduced into the processing furnace 2, the occurrence of a situation in which the organic solvent vaporizes and flows back can be effectively inhibited even when the temperature of the processing furnace 2 is high.

Furthermore, according to the processing apparatus 501 of the present embodiment as well, by the organic solvent introduction unit 300 introducing the liquid organic solvent intermittently a plurality of times, it is possible to achieve introduction of an appropriate amount thereof at timings suitable for a status in the processing furnace 2. Thus, the organic solvent can be additionally introduced in the middle of the pre-treatment, which can remarkably enhance the effects of introducing the organic solvent, i.e. the activation effects on the surface of the metal member S. Specifically, by controlling the pump 303, the organic solvent can be introduced two times to six times, 10 minutes or more apart, wherein 10 ml to 80 ml of the organic solvent can be introduced per time at a substantially uniform speed during a course of 1 second to two minutes.

In addition, according to the processing apparatus 501 of the present embodiment as well, the organic solvent introduction unit 300 has the check valve 304 on an upstream side of the furnace gas introduction pipe 29 (atmospheric gas introduction pipe). Thereby, it is prevented that the organic solvent flows back, which makes it possible to achieve introduction of an appropriate amount of the organic solvent more accurately.

In addition, according to the processing apparatus 501 of the present embodiment as well, the metal component S is loaded and unloaded with respect to the processing furnace 2 in a horizontal direction through the furnace opening/closing lid 7. Thereby, even if precipitation of the organic solvent occurs, a risk of contact between precipitate and the metal component S is smaller.

In the processing apparatus 501 of the present embodiment as well, it is preferable that the pre-treatment temperature (first temperature) is set within a range of from 400° C. to 500° C. According to this temperature range, the activation treatment of the metal component S can suitably progress, while the occurrence of a situation in which the organic solvent vaporizes and flows back can be effectively inhibited.

In the processing apparatus 501 of the present embodiment as well, for example, the activation atmospheric gas may include an ammonia gas, and the organic solvent may be composed of a compound including at least one type of hydrocarbon. In this case, HCN is produced during a reaction process starting with a thermal decomposition of the organic solvent, and the produced HCN can reduce the passivation film on the surface of the metal component S and can activate the surface effectively. Specifically, for example, the organic solvent is composed of any one of formamide, xylene and toluene. In these cases, by using an actual production furnace, the present inventor has confirmed that it is effective to adopt a condition wherein the organic solvent is introduced two times to six times, 10 minutes or more apart, and wherein 10 ml to 80 ml of the organic solvent is introduced per time at a substantially uniform speed during a course of 1 second to two minutes.

Furthermore, in the processing apparatus 501 of the present embodiment as well, for example, the activation atmospheric gas may include an ammonia gas, and the organic solvent may be composed of a compound including at least one type of chlorine. In this case, HCl is produced during a reaction process starting with a thermal decomposition of the organic solvent, and the produced HCN can reduce the passivation film on the surface of the metal component S and can activate the surface effectively. Specifically, for example, the organic solvent is composed of any one of trichloroethylene, tetrachloroethylene and tetrachloroethane. In these cases, by using an actual production furnace, the present inventor has confirmed that it is effective to adopt a condition wherein the organic solvent is introduced two times to six times, 10 minutes or more apart, and wherein 10 ml to 80 ml of the organic solvent is introduced per time at a substantially uniform speed during a course of 1 second to two minutes.

(Variants of Processing Apparatus 501)

Figure 8:
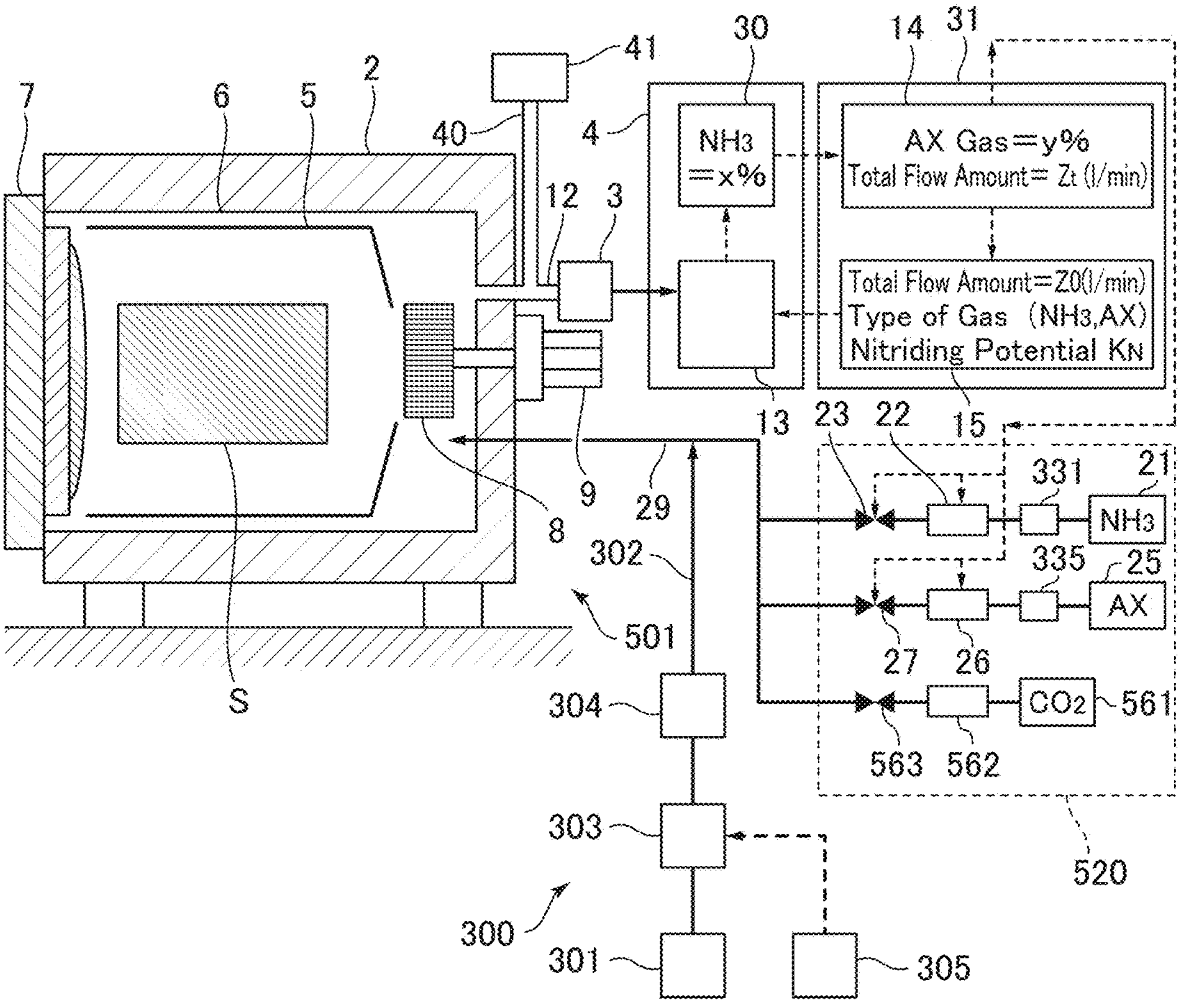
FIG. 8 is a schematic view showing a variant of the processing apparatus for the metal component according to the second embodiment.

FIG. 8 is a schematic view showing a variant of the processing apparatus 501. As shown in FIG. 8, in the present variant, a dehumidifier 331 is provided on an upstream side of the first supply amount controller 22 for the ammonia gas (as an example of on a way of the atmospheric gas introduction pipe), and another dehumidifier 335 is provided on an upstream side of the second supply amount controller 26 for the ammonia decomposition gas (as an example of on a way of the atmospheric gas introduction pipe). When the second furnace introduction gas supplier 25 is a pipe arranged from a thermal decomposition furnace that thermally decomposes an ammonia gas to produce an ammonia decomposition gas, a dehumidifier may be provided on an upstream side of the thermal decomposition furnace (the ammonia gas as a raw material for the ammonia decomposition gas is dehumidified). Furthermore, when an ammonia gas after being dehumidified by a dehumidifier provided on an upstream side of the first supply amount controller 22 is distributed and supplied to the thermal decomposition furnace, this one dehumidifier is enough.

According to this variant, it may be effectively prevented that characteristics of the metal component S is deteriorated by moisture that may be contained in the activation atmospheric gas (the ammonia gas and the ammonia decomposition gas). According to the inventor's knowledge, if the amount of moisture is large, circular stains may appear on the metal component S after being nitrocarburized, as shown in FIG. 5 (its appearance may be spoiled).

Figure 9:
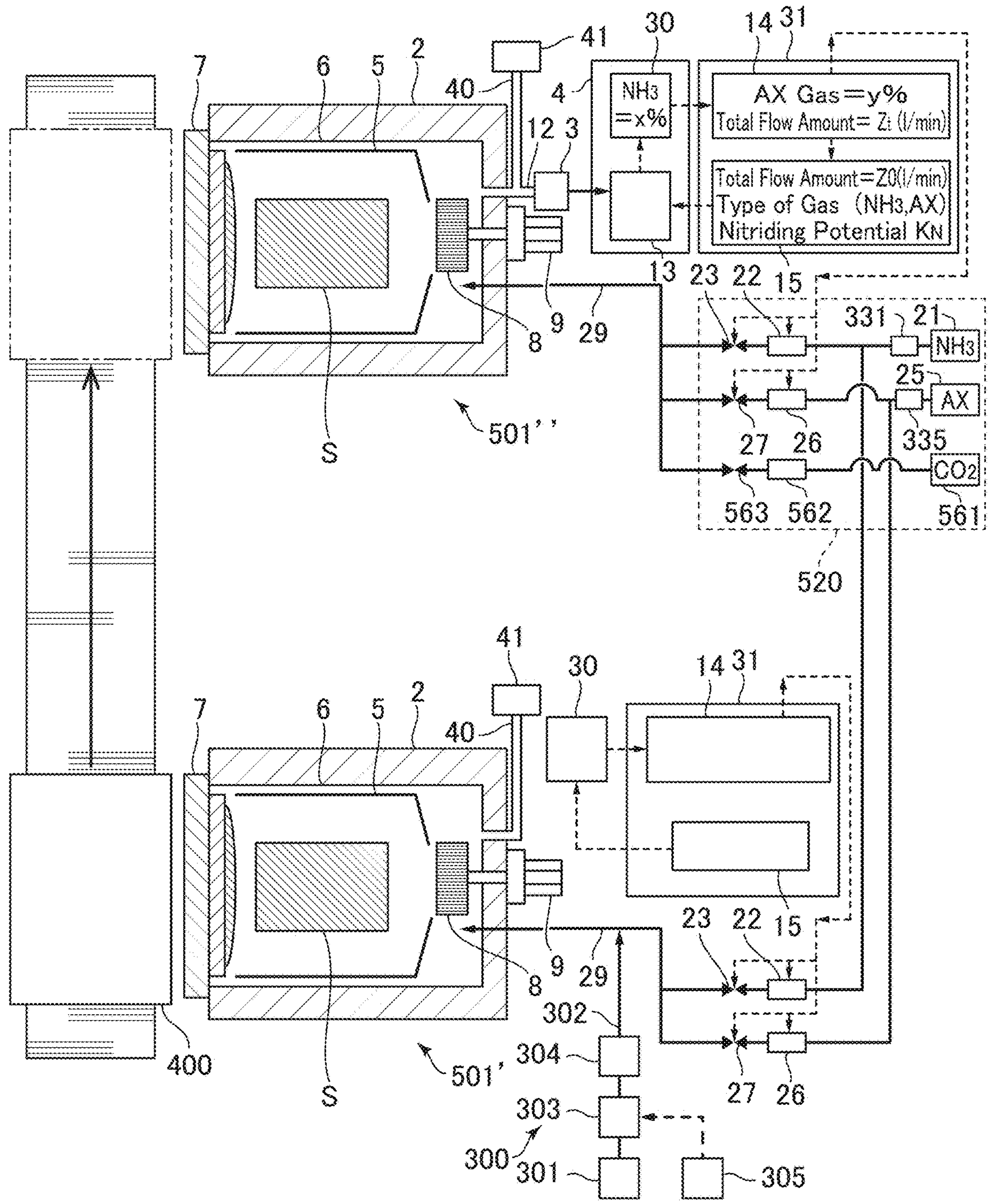
FIG. 9 is a schematic view showing a further variant of the processing apparatus for the metal component according to the second embodiment.

In addition, FIG. 9 is a schematic view showing a further variant of the processing apparatus 501. In the further variant shown in FIG. 9, two processing apparatuses 501', 501" are configured to work together.

The first processing apparatus 501' is used for an activation treatment. Compared to the processing apparatus 501 as described above, the atmospheric gas detection pipe 12, the atmospheric gas concentration detector 3, the in-furnace nitriding potential calculator 13, the third supply amount controller 562, and the third supply valve 563 may be omitted.

The second processing apparatus 501" is used for a nitrocarburizing treatment. Compared to the processing apparatus 501 as described above, the organic solvent introduction unit 300 may be omitted.

In addition, in the further variant, a mobile furnace 400 (a vacuum furnace or an atmospheric gas furnace) for transferring the metal component S that has been pre-treated by the first processing apparatus 501' to the second processing apparatus 501" is provided in a movable manner from an area in the vicinity of the furnace opening/closing lid 7 of the first processing apparatus 501' to another area in the vicinity of the furnace opening/closing lid 7 of the second processing apparatus 501".

In addition, as shown in FIG. 9, the first furnace introduction gas supplier 21 (tank) for the ammonia gas and the second furnace introduction gas supplier 25 (tank or pipe) for the ammonia decomposition gas are common in the two processing apparatuses 501', 501".

According to this variant, since the nitrocarburizing treatment is performed in the processing furnace 2 of the second processing apparatuses 501" separately after the activation treatment has been performed in the processing furnace 2 of the first processing apparatuses 501', there is no risk of precipitation of the organic solvent during the nitrocarburizing treatment in the processing furnace 2 of the second processing apparatuses 501".

In addition, according to this variant, the nitrocarburizing treatment in the processing furnace 2 of the second processing apparatuses 501" and the activation treatment in the processing furnace 2 of the first processing apparatuses 501' for the next metal component S can be performed simultaneously, which can increase productivity.

DESCRIPTION OF REFERENCE SIGNS

1 Processing apparatus
1' First processing apparatus
1" Second processing apparatus
2 Processing furnace
3 Atmospheric gas concentration detector
4 Nitriding potential adjustor
7 Furnace opening/closing lid
8 Stirring fan
9 Stirring-fan drive motor
12 Atmospheric gas detection pipe
13 In-furnace nitriding potential calculator
14 Gas introduction amount controller
15 Parameter setting device
20 Furnace introduction gas supplier
21 First furnace introduction gas supplier
22 First supply amount controller
23 First supply valve
25 Second furnace introduction gas supplier
26 Second supply amount controller
27 Second supply valve
29 Furnace gas introduction pipe
30 Gas flow rate output adjustor
31 Programmable logic controller
40 Furnace-gas exhaust pipe
41 Exhaust-gas combustion decomposition unit
**201*h*** Heater
202 Cylinder
203 Stirring fan
204 Cylinder
205 Gas introduction pipe
206 Exhaust device
208 Lid
209 Fan
300 Organic solvent introduction unit

301 Container
302 Organic solvent introduction pipe
303 Pump
304 Check valve
305 Organic solvent introduction controller
331 Dehumidifier
335 Dehumidifier
400 Mobile furnace
S Metal component
501 Processing apparatus
501' First processing apparatus
501" Second processing apparatus
561 Third furnace introduction gas supplier
562 Third supply amount controller
563 Third supply valve

What is claimed is:

1. A processing method for a metal component by using a processing furnace, comprising:

a metal-component loading step of loading a metal component into a processing furnace;

an activation atmospheric-gas introducing step of introducing an activation atmospheric gas into the processing furnace;

a first heating step of heating the activation atmospheric gas in the processing furnace to a first temperature;

a main atmospheric-gas introducing step of introducing a nitriding atmospheric gas or a nitrocarburizing atmospheric gas into the processing furnace, after the first heating step; and a second heating step of heating the nitriding atmospheric gas or the nitrocarburizing atmospheric gas in the processing furnace to a second temperature in order to nitride or nitrocarburize the metal component;

wherein during the first heating step, a liquid organic solvent is introduced intermittently a plurality of times into the processing furnace, the activation atmospheric gas includes an ammonia gas, and the organic solvent is composed of a compound including at least one type of hydrocarbon.

2. The processing method according to claim 1, wherein the organic solvent is composed of any one of formamide, xylene and toluene.

3. The processing method according to claim 1, wherein during the activation atmospheric-gas introducing step, the activation atmospheric gas is introduced into the processing furnace through a pipe for introducing the activation atmospheric gas;

during a partial period of the first heating step, the activation atmospheric-gas introducing step is simultaneously carried out; and during the partial period, a liquid organic solvent is introduced intermittently a plurality of times into the pipe for introducing the activation atmospheric gas.

4. The processing method according to claim 3, wherein the organic solvent is introduced two times to six times, 10 minutes or more apart, and 10 ml to 80 ml of the organic solvent is introduced per time at a substantially uniform speed during a course of 1 second to two minutes.

5. The processing method according to claim 1, wherein the first temperature is within a range of from 400° C. to 500° C.

6. A processing method for a metal component by using a processing furnace, comprising:

a metal-component loading step of loading a metal component into a processing furnace;

an activation atmospheric-gas introducing step of introducing an activation atmospheric gas into the processing furnace;

a first heating step of heating the activation atmospheric gas in the processing furnace to a first temperature;

a main atmospheric-gas introducing step of introducing a nitriding atmospheric gas or a nitrocarburizing atmospheric gas into the processing furnace, after the first heating step; and a second heating step of heating the nitriding atmospheric gas or the nitrocarburizing atmospheric gas in the processing furnace to a second temperature in order to nitride or nitrocarburize the metal component;

wherein during the first heating step, a liquid organic solvent is introduced intermittently a plurality of times into the processing furnace, the activation atmospheric gas includes an ammonia gas, and the organic solvent includes a chlorine-containing compound.

7. The processing method according to claim 6, wherein the organic solvent is composed of any one of trichloroethylene, tetrachloroethylene and tetrachloroethane.

8. The processing method according to claim 6, wherein during the activation atmospheric-gas introducing step, the activation atmospheric gas is introduced into the processing furnace through a pipe for introducing the activation atmospheric gas;

during a partial period of the first heating step, the activation atmospheric-gas introducing step is simultaneously carried out; and during the partial period, a liquid organic solvent is introduced intermittently a plurality of times into the pipe for introducing the activation atmospheric gas.

9. The processing method according to claim 8, wherein the organic solvent is introduced two times to six times, 10 minutes or more apart, and 10 ml to 80 ml of the organic solvent is introduced per time at a substantially uniform speed during a course of 1 second to two minutes.

10. The processing method according to claim 6, wherein the first temperature is within a range of from 400° C. to 500° C.

11. A processing apparatus for a metal component, comprising:

a processing furnace;

a metal-component loading mechanism for loading a metal component into the processing furnace;

an atmospheric-gas introduction pipe arranged to communicate with an inside of the processing furnace for introducing an atmospheric gas into the processing furnace;

an organic-solvent introduction unit for introducing a liquid organic solvent intermittently a plurality of times into the processing furnace, and a heating unit for heating the atmospheric gas in the processing furnace to a predetermined temperature, wherein the atmospheric gas is an activation atmospheric gas, the activation atmospheric gas includes an ammonia gas, and the organic solvent is composed of a compound including at least one type of hydrocarbon.

12. The processing apparatus according to claim 11, wherein the organic solvent is composed of any one of formamide, xylene and toluene.

13. The processing apparatus according to claim 11, wherein the organic-solvent introduction unit is configured to introduce the liquid organic solvent intermittently the plurality of times through the atmospheric-gas introduction pipe into the processing furnace.

14. The processing apparatus according to claim 11, wherein the organic-solvent introduction unit has a check valve on an upstream side of the atmospheric-gas introduction pipe.

15. The processing apparatus according to claim 11, wherein a dehumidifier is provided on a way of the atmospheric-gas introduction pipe.

16. The processing apparatus according to claim 11, wherein the metal-component loading mechanism is configured to load and unload the metal component with respect to the processing furnace in a horizontal direction.

17. A processing apparatus for a metal component, comprising:

a processing furnace;

a metal-component loading mechanism for loading a metal component into the processing furnace;

an atmospheric-gas introduction pipe arranged to communicate with an inside of the processing furnace for introducing an atmospheric gas into the processing furnace;

an organic-solvent introduction unit for introducing a liquid organic solvent intermittently a plurality of times into the processing furnace, and a heating unit for heating the atmospheric gas in the processing furnace to a predetermined temperature, wherein the atmospheric gas is an activation atmospheric gas, the activation atmospheric gas includes an ammonia gas, and the organic solvent includes a chlorine-containing compound.

18. The processing apparatus according to claim 17, wherein the organic solvent is composed of any one of trichloroethylene, tetrachloroethylene and tetrachloroethane.

19. The processing apparatus according to claim 17, wherein the organic-solvent introduction unit is configured to introduce the liquid organic solvent intermittently the plurality of times through the atmospheric-gas introduction pipe into the processing furnace.

20. The processing apparatus according to claim 17, wherein the organic-solvent introduction unit has a check valve on an upstream side of the atmospheric-gas introduction pipe.

21. The processing apparatus according to claim 17, wherein a dehumidifier is provided on a way of the atmospheric-gas introduction pipe.

22. The processing apparatus according to claim 17, wherein the metal-component loading mechanism is configured to load and unload the metal component with respect to the processing furnace in a horizontal direction.

* * * * *